(12) United States Patent
Diamond et al.

(10) Patent No.: US 11,333,033 B2
(45) Date of Patent: May 17, 2022

(54) METHOD AND SYSTEM FOR MEASURING ROTOR BLADE TIP DEFLECTION USING BLADE TIP TIMING (BTT)

(71) Applicant: University of Pretoria, Pretoria (ZA)

(72) Inventors: David Hercules Diamond, Pretoria (ZA); Philippus Stephanus Heyns, Pretoria (ZA); Abraham Johannes Oberholster, Pretoria (ZA)

(73) Assignee: University of Pretoria, Pretoria (ZA)

( * ) Notice: Subject to any disclaimer, the term of this patent is extended or adjusted under 35 U.S.C. 154(b) by 818 days.

(21) Appl. No.: 16/312,028

(22) PCT Filed: Jun. 27, 2017

(86) PCT No.: PCT/IB2017/053828
§ 371 (c)(1),
(2) Date: Dec. 20, 2018

(87) PCT Pub. No.: WO2018/002819
PCT Pub. Date: Jan. 4, 2018

(65) Prior Publication Data
US 2019/0376406 A1 Dec. 12, 2019

(30) Foreign Application Priority Data
Jun. 27, 2016 (ZA) .................. 2016/04322

(51) Int. Cl.
*F01D 17/02* (2006.01)
*F01D 21/00* (2006.01)
(52) U.S. Cl.
CPC ........... *F01D 17/02* (2013.01); *F01D 21/003* (2013.01); *F05D 2260/80* (2013.01);
(Continued)

(58) Field of Classification Search
CPC .. F01D 17/02; F01D 21/003; F05D 2270/821; F05D 2270/809; F05D 2270/334; F05D 2260/80
See application file for complete search history.

(56) References Cited

U.S. PATENT DOCUMENTS 5,206,816 A 4/1993 Hill
9,840,935 B2 * 12/2017 Khibnik ............... F01D 21/003
(Continued)

FOREIGN PATENT DOCUMENTS

| EP | 2073019 A2 | 6/2009 |
|---|---|---|
| EP | 2402562 A2 | 1/2012 |
| EP | 2781897 A2 | 9/2014 |

OTHER PUBLICATIONS

Heath et al., An Improved Single-Parameter Tip-Timing Method for Turbomachinery Blade Vibration Measurements Using Optical Laser Probes, International Journal of Mechanical Sciences, Oct. 1, 1996, pp. 1047-1058, vol. 38, N. 10, Pergamon Press, Oxford, GB.
(Continued)

*Primary Examiner* — Aditya S Bhat
(74) *Attorney, Agent, or Firm* — Vitale, Vickrey, Niro & Gasey LLP

(57) ABSTRACT

A method (400) of measuring rotor blade tip deflections of turbomachine rotor blades ($R_1$, $R_2$) during operation using Blade Tip Timing (BTT) includes measuring (402), by a proximity sensor (202), a proximity signal caused by a moving rotor blade ($R_1$, $R_2$) and determining (412), by a control module (212), a Time-of-Arrival (ToA). The method (400) includes measuring a time that the shaft starts to rotate a measurable angular distance and a time the shaft has completed its rotation of the measurable distance and storing (406) timing data indicative of a plurality of ToA measurements of the rotor blade ($R_1$, $R_2$) and the zero crossing times. The method (400) includes determining the shaft Instanta-
(Continued)

neous Angular Position (IAP) between at least two zero crossing times, which determination comprises expressing the shaft IAP between at least two zero crossing times as a continuous, non-constant IAP mathematical function of time, with unknown function coefficients and calculating the unknown function coefficients of the IAP mathematical function.

21 Claims, 10 Drawing Sheets

(52) U.S. Cl.
CPC .. *F05D 2270/334* (2013.01); *F05D 2270/809* (2013.01); *F05D 2270/821* (2013.01)

(56) References Cited

U.S. PATENT DOCUMENTS

2013/0321824 A1    12/2013  Hockaday
2014/0007591 A1*  1/2014  Khibnik ................ F01D 21/003
                                                702/56

OTHER PUBLICATIONS

International Search Report in corresponding PCT Application No. PCT/IB2017/053828.

* cited by examiner

METHOD AND SYSTEM FOR MEASURING ROTOR BLADE TIP DEFLECTION USING BLADE TIP TIMING (BTT)

This patent application is a 35 U.S.C. 371 national stage application of International Patent Application No. PCT/IB2017/053828, filed on Jun. 27, 2017, which claims priority to South African Patent Application No. 2016/04322, filed on Jun. 27, 2016. All of these disclosures are hereby expressly incorporated by reference as part of the present disclosure as if fully set forth herein.

FIELD OF INVENTION

This invention relates to monitoring of turbomachinery and more specifically to a method and system for measuring rotor blade tip deflection using Blade Tip Timing (BTT).

BACKGROUND OF INVENTION

Rotor blades are the most essential structural components found in any turbomachine. The static centrifugal forces and operating temperatures experienced by a rotor blade can be immense. In addition to this, rotor blades can experience high dynamic stresses due to excitation at or near one of its natural frequencies. The source of excitation might be due to mechanical elements in the turbomachine like struts, stator vanes and other fixed features [1], or alternatively due to aerodynamic causes, like flutter, rotating stall, surge or acoustic resonance [2, 3]. Continuously monitoring the dynamic response of turbine blades is of paramount importance for staying clear of damaging operating conditions and of quantifying the severity of resonance events that have occurred [4]. This is becoming increasingly important as the trend in turbomachinery is for higher operating speeds and loads [5].

Blade Tip Timing (BTT) is a condition monitoring technique that can be used for continuously monitoring rotor blade dynamic response. The most fundamental function of any BTT system can be expressed as follows:
1. To obtain, as accurately as possible, the rotor blade tip deflections; and
2. To inform the turbomachine operator if the rotor blades are experiencing damaging dynamic stresses.

A BTT system consists of several circumferentially spaced proximity probes mounted into the turbomachine casing. On each occasion that a rotor blade passes underneath a probe, a pulse is produced in the output of the sensor signal. These pulses can be analysed to determine the precise Time of Arrival (ToA) of the blade at the probe. In addition to this, a shaft encoder is used to determine the position of the shaft. A Once Per Revolution (OPR) shaft encoder is usually used, giving a pulse each time the shaft has completed a single revolution. Because the blades are connected rigidly to the shaft, it should in theory be possible to predict the ToA of the blades with knowledge of the shaft speed. If the measured ToA is different from the predicted ToA, it means the blade is deflected from its mean position due to vibration. The difference between the expected ToA and the measured ToA can then be used to calculate the blade tip deflection. This deflection can in turn be used to determine whether or not the blades are vibrating excessively.

FIG. 1 illustrates this concept. In FIG. 1a) a turbomachine, rotating at an angular speed of $\Omega$, with three blades is presented. An OPR encoder keeps track of the shaft position. A proximity probe in the turbine casing observes blades as they pass. The top blade is shown in two states. The first state (illustrated in solid) indicates a blade that is not undergoing vibration. The second state (indicated by the dotted line) illustrates a blade that is bent due to vibration. In FIG. 1b), the proximity probe output is shown for both the vibrating blade and the blade if no vibration is present. It can be seen that the pulse is shifted in time. This leads to different ToAs and hence an indication of vibration.

The method of determining tip deflections as set out above is an example of a typical explanation found in PRIOR ART literature. There are however many aspects in the process that need careful attention. Three aspects are mentioned below.

Constant shaft speed assumption: The established technique for calculating the tip deflection is by first calculating the expected ToA. The expected ToA and the measured ToA is then used to calculate the tip deflection. The general, PRIOR ART, mathematical method for calculating these quantities are given in Eq. 1 and Eq. 2:

$$t_{expected} = \frac{\theta_d}{\Omega} \quad (1)$$

$$x_{constant\ speed} = R\Omega(t_{measured} - t_{expected}) \quad (2)$$

In Eq. 1, $\theta d$ is the angular distance between a blade and a proximity probe, and $\Omega$ is the shaft angular speed of the revolution. The expected ToA is indicated by $t_{expected}$. The tip deflection is then calculated with Eq. (2) once the tip arrival time has been measured. The radius of the blade is indicated by R. The underlying assumption behind Eq. 1 and Eq. 2 is that the shaft speed is constant during every revolution. This assumption is observed in most of published PRIOR ART BTT literature [6, 7, 8, 2, 9, 10, 11, 12, 3] and is held because it results in a simple formula for calculating the tip deflection. This method for calculating the tip deflection is generally used for turbomachines operating under steady state conditions as well as transient conditions such as a run-up.

This assumption is incorrect. During steady state conditions, there will always be a minimal amount of unsteady shaft motion. In the case of transient conditions, like a turbine run-up, it stands to reason that this assumption is incorrect. It therefore leads to an incorrect estimation of the expected arrival time and tip deflection. In BTT, where blade tip deflections as small as 3 µm can be of interest [13], all possible measures should be taken to minimize unnecessary errors.

The Applicants believes that it would be more accurate to use the shaft Instantaneous Angular Position (IAP) to determine the blade expected arrival position. The shaft IAP is a continuous function that can be used to determine the shaft angular position at any given time t.

Constant static blade position assumption: Regardless of how one chooses to calculate the shaft speed, it is necessary to know the blade static position in order to determine the tip deflection. For such an important step, the process of determining the static positions is not discussed frequently in literature. Many authors simply state that this quantity is known. This assumption at first seems valid. The blade static positions and sensor static positions are at least approximately known. The intent of manufacturing is to make all blades geometrically identical and equally spaced around the rotor. Also, the intent during sensor installation is to install each sensor precisely at a predetermined position around the casing of the turbomachine. However, manufacturing tolerances in the rotor structure and sensor installation will always be present. Any error in the assumed blade and sensor positions will therefore result in erroneous tip deflection calculations.

Some authors state that the static positions can be determined by measuring the ToA's while the shaft is rotating slowly. It is believed that the blades will experience low vibration levels at a slow rotational speed [8, 12]. Although this assumption might be true in some cases, there is no reason to suppose that vibration levels will always be negligible for the purpose of calibration. Wherever a working fluid is present, upstream and downstream disturbances will be present, causing blade vibration.

It also appears from literature that once the blade static positions have been established, it cannot change. A few simple examples show in fact that the blade static positions can change:

Different operating conditions of the turbomachine changes the blade static position. Axial shift of the rotor due to shaft temperature expansion causes the blades to shift slightly in the rotor axial direction. The proximity probes will thus measure a different part along the chord of the blades' airfoil, changing the static arrival time.

Increasing rotational speed causes increasing centrifugal forces in the blades. This in turn causes each blade to change in shape slightly. This is usually referred to as blade untwist [15].

The boundary conditions of some blades (like those with fir-tree attachments) change with increased centrifugal force. At low rotational speeds, a rigid connection might not have been formed by the attachment, leading to a different static position than at higher rotational speeds. Also, the centrifugal force locks the attachment into a particular configuration [16]. This means that if the rotor is run down to rest and then up again, the boundary condition might look slightly different and therefore the static tip position might be different.

Changes in the blade structure, such as cracks and erosion, will also change the blade static position [17].

It is therefore necessary to establish a method for calibrating the sensor and blade static positions. This process can and should be repeated each time the turbomachine operator deems it necessary, or an automated system determines algorithmically such action is necessary. The Applicant is only aware of a single published case where this need for recalibration is given attention. The authors in [18], in a patent application, describes a method to perform data zeroing, i.e. calibration of blade static position. It is mentioned that previous methods of performing data zeroing relied on the manual labour of skilled engineers to isolate vibration events and to determine the blade static position from the non-resonant blade arrival positions. The method described in the patent application uses tip deflections from at least two revolutions to calculate a common and a unique displacement value for each blade. These values are used in turn to zero the tip displacements. It is mentioned in the patent that the method can be fully automated, reducing the reliance on skilled labour.

Detecting a resonance event: A major field of study in BTT is the determination of the blade vibration characteristics during resonance. BTT signals are generally subsampled because of the limited number of proximity probes used. Because of this, conventional signal processing techniques like the Fourier Transform has limited applicability. To address this difficulty, many different BTT algorithms have been developed to infer the blade vibration characteristics [19, 4, 20, 21, 11]. Many of these methods can be used in only certain situations and requires prior knowledge of blade characteristics, like the natural frequencies. They can be time consuming to implement and generally requires a person with expertise in BTT to interpret the results.

The simplest application of BTT for continuous monitoring, however, is simply concerned with informing the turbomachine operator if the blades are experiencing excessive vibration. Any resonance event, regardless of in-depth knowledge about the vibration frequency and amplitude, is considered damaging to the blades and must be avoided. It is therefore useful to have a method that serves simply as an indicator of the blade vibration levels.

Once again, relatively little has been published regarding the determination of excessive vibration levels. The most basic method, and presumably the one most often used, is tip deflection thresholding [22]. Using this method, a thresholding value is set which the tip deflection should not exceed. If the limit is exceeded, a vibration event is presumed to have occurred. Russhard [22] however, shares two deficiencies of the thresholding approach. Firstly, the thresholding technique can lead to false positive results because of inherent noise in the tip displacement signal. Secondly, synchronous vibration events that cause a small DC shift in a blades' tip deflection can also be missed, as the thresholding technique might not be sensitive to it.

Russhard [22] describes another resonance detection method that should be more reliable. Firstly, the process consists of continually updating the blade static positions by taking a running average of each blade's static position. This is done over a fixed number of revolutions, say 32. The new tip deflections are then used to infer the vibration amplitude and phase of a vibration model. The model could, for example, take the form of a single sinusoid. Once determined, the model coefficients are used to calculate the tip deflections as if the blade vibration adhered to the model perfectly. A correlation between the calculated and measured tip deflections is then obtained. For instance, the Pearson correlation coefficient can be used. If the correlation coefficient crossed a certain predetermined value, indicating high correlation, a vibration event is triggered. The method should be able to identify synchronous vibration events. It is however unlikely to identify asynchronous vibration events. This method might also require one to calculate the correlation coefficient for a wide range of engine order values, which might be time consuming.

Accordingly, the present invention aims to provide a simple, novel method to aid in the identification of a vibration event. The method does not require curve fitting of vibration models.

SUMMARY OF INVENTION

Accordingly, the invention provides a method for measuring rotor blade tip deflections of turbomachine rotor blades during operation using Blade Tip Timing (BTT), the turbomachine comprising a housing and rotor including a shaft with the rotor blades attached thereto and at least one proximity probe mounted to the housing, the method including:

measuring, by the proximity sensor, a proximity signal caused by a presence of a proximate tip of a moving rotor blade; determining, by a control module, a Time-of-Arrival (ToA) of the proximate rotor blade tip from the measured signal;

measuring, by a shaft encoder, a time that the shaft starts to rotate a measurable angular distance and a time the shaft has completed its rotation of the measurable distance (these times are henceforth referred to as zero crossing times);

storing, in a memory module at least temporarily, timing data indicative of a plurality of ToA measurements of the rotor blade and the zero crossing times;

determining, by the control module, the shaft Instantaneous Angular Position (IAP) between at least two zero crossing times, which determination comprises:
   expressing, by the control module, the shaft IAP between at least two zero crossing times as a continuous, non-constant IAP mathematical function of time, with unknown function coefficients; and
   calculating, by the control module, the unknown function coefficients of the IAP mathematical function using at least the following information:
      the angular distance travelled by the shaft in between the recorded zero crossing times; and
      the values of the recorded zero crossing times applicable to the IAP mathematical function;

determining, by the control module, the shaft IAP at each stored ToA using the IAP mathematical function; and calculating, by the control module, the rotor blade tip deflection at each ToA using the IAP at each ToA and a stored IAP value representing an expected angular arrival location.

The method may include raising an alert in response to the rotor blade tip deflection exceeding a first threshold. Raising the alert may include sending an alert message to a designated recipient.

The method may include automatically stopping the turbomachine in response to the rotor blade tip deflection exceeding a second threshold. The control module may be connected to a control system of the turbomachine. The method may include sending, by the control module, an interrupt message to the control system of the turbomachine.

The method may include measuring a tip deflection every time that the associated rotor blade passes the sensor. There may be plural sensors arranged circumferentially around the housing. The method may include measuring, by the plural circumferentially arranged sensors, the proximity signal caused by the blade tip at various angular orientations.

The method may include determining, by the control module, the values of the measurable distances the shaft has travelled in between zero crossing times.

The method may include deriving, by the control module, zero crossing times and the corresponding angular distances travelled by the shaft from the ToA values and using those values in the calculation of the IAP mathematical function.

The method may include using a Kalman filter to calculate the IAP function coefficients. Using the Kalman filter may include expressing, by the control module, the shaft (IAP) as a state-space equation where each state is represented by a different angular distance travelled by the rotor between two zero crossing times. Using the Kalman filter may include filtering, by the control module, using a Kalman filter, each state of the state equation. Filtering each state of the state equation may include predicting a present state of the state equation from the previous state of the state equation. Filtering each state of the state equation may include using the prediction of the present state of the state equation to estimate the rotor IAP. Filtering each state of the state equation may include using the stored zero crossing times to update the estimated state variable, leading to a final estimation of the present state. Filtering each state of the state equation may include determining, from the present state, the shaft IAP.

The method may include calculating the stored IAP for each blade and each sensor combination where the stored IAP represents the expected arrival angular position.

The method may include calculating, by the control module, the difference between the largest and the smallest tip deflections for a single blade obtained through the blade passing two or more proximity probe sensors during a single revolution (henceforth referred to as the disparity filter output) and determining if the disparity filter output indicates a resonance event. The method may include raising an alert in response to the disparity filter output exceeding a first threshold. Raising the alert may include sending an alert message to a designated recipient.

The method may include automatically stopping the turbomachine in response disparity filter output exceeding a second threshold.

The method may include measuring a tip deflection every time that the associated rotor blade passes the sensor. There may be plural sensors arranged circumferentially around the housing. Accordingly, the method may include measuring the proximity signal caused by the blade tip at various angular orientations.

The method may include the use of a Once Per Revolution (OPR) incremental shaft encoder that can be used to measure the zero crossing times at each complete revolution of the shaft. The method may include the use of a Multiple Pulses Per Revolution (MPR) incremental shaft encoder that can be used to measure the zero crossing times at each increment of the encoder. The method may include the use of any other shaft encoder that can be used to determine the start and end times that the shaft has travelled a measurable distance. The method may include a mathematical method to determine the values of the measurable distances the shaft has travelled in between zero crossing times in the absence of firmly established values.

The method may include deriving zero crossing times and the corresponding angular distances travelled by the shaft from the ToA values and using those values in the calculation of the IAP mathematical function.

The method, may include the use of a Kalman filter to calculate the IAP function coefficients. The Kalman filter implementation may include the following steps:
   expressing, by the control module, the shaft (IAP) as a state-space equation where each state is represented by a different angular distance travelled by the rotor between two zero crossing times;
   filtering, by the control module, using a Kalman filter, each state of the state equation which comprises:
      predicting a present state of the state equation from the previous state of the state equation;
      using the prediction of the present state of the state equation to estimate the rotor IAP; and
      using the stored zero crossing times to update the estimated state variable, leading to a final estimation of the present state,
   determining, from the present state, the shaft IAP.

The method may include calculating, by the control module, the stored IAP for each blade and each sensor combination where the stored IAP represents the expected arrival angular position.

The method may include calculating, by the control module, the difference between the largest and the smallest tip deflections for a single blade obtained through the blade passing two or more proximity probe sensors during a single revolution (henceforth referred to as the disparity filter output) and determining if the disparity filter output indicates a resonance event.

The method may include raising an alert in response to the disparity filter output exceeding a first threshold (e.g., a maintenance threshold). The method may include raising an alert by sending an alert message to a designated recipient (e.g., a plant administrator).

The method may include automatically stopping the turbomachine in response disparity filter output exceeding a second threshold (e.g., a failure threshold). The control module may be connected to a control system of the turbomachine. The method may include sending, by the control module, an interrupt message to the control system of the turbomachine.

The invention extends to a system configured to measure rotor blade tip deflections of turbomachine rotor blades during operation using Blade Tip Timing (BTT), the turbomachine comprising a housing and rotor including a shaft with the rotor blades attached thereto and at least one proximity probe mounted to the housing, the system including:
  at least one proximity sensor mounted to the housing and configured to measure a Time-of-Arrival (ToA) of a proximate tip of a moving rotor blade;
  a sensor operable to measure the time that the shaft starts to rotate a measurable angular distance and the time the shaft has completed its rotation of the measurable distance (these times are henceforth referred to as zero crossing times);
  a memory module configured to store, at least temporarily, timing data indicative of a plurality of ToA measurements and the shaft encoder zero crossing times;
  a control module configured to:
    determine the shaft Instantaneous Angular Position (IAP) between at least two zero crossing times, which comprises:
      expressing, by the control module, the shaft IAP between at least two zero crossing times as a continuous, non-constant mathematical function of time, with unknown function coefficients;
      calculating the unknown function coefficients of the beforementioned mathematical function using at least the following information:
        the angular distance travelled by the shaft in between the zero crossing times;
        the values of the zero crossing times applicable to the mathematical function;
      determining the shaft IAP at each stored ToA using the solved IAP mathematical function; and
      calculating the rotor blade tip deflection, in either angular or rectilinear units or both, at each ToA using the IAP at each ToA and a stored IAP value representing the expected angular arrival location.

The invention extends further to a system configured to measure rotor blade tip deflections of turbomachine rotor blades during operation using Blade Tip Timing (BTT), the turbomachine comprising a housing and rotor including a shaft with the rotor blades attached thereto and at least one proximity probe mounted to the housing, the system including:
  at least one proximity sensor mounted into the housing and configured to measure a proximity signal from a presence of a proximate tip of a moving rotor blade;
  a shaft encoder operable to measure the time that the shaft starts to rotate a measurable angular distance and the time the shaft has completed its rotation of the measurable distance (these times are henceforth referred to as zero crossing times);
  a memory module configured to store, at least temporarily, timing data indicative of a plurality of ToA measurements and the shaft encoder zero crossing times;
  a control module configured to:
    calculate the ToA from the ToA signal;
    determine the shaft Instantaneous Angular Position (IAP) between at least two zero crossing times, which comprises:
      expressing, by the control module, the shaft IAP between at least two zero crossing times as a continuous, non-constant mathematical function of time, with unknown function coefficients;
      calculating the unknown function coefficients of the beforementioned mathematical function using at least the following information:
        the angular distance travelled by the shaft in between the zero crossing times;
        the values of the zero crossing times applicable to the mathematical function; determining the shaft IAP at each stored ToA using the solved IAP mathematical function; and
      calculating the rotor blade tip deflection, in either angular or rectilinear units or both, at each ToA using the IAP at each ToA and a stored IAP value representing the expected angular arrival location.

The shaft encoder may be a Once Per Revolution (OPR) incremental shaft encoder to measure the zero crossing times at each complete revolution of the shaft. The shaft encoder may be a Multiple Pulses Per Revolution (MPR) incremental shaft encoder that can be used to measure the zero crossing times at each increment of the encoder.

There may be a plurality of proximity sensors. The sensors may be spaced circumferentially around the housing. The sensors may be spaced circumferentially along only an arcuate portion of the housing. The sensors may be spaced along a 90° arc. For example, there may be four sensors, each spaced 20-30° apart. The sensors may be regularly or irregularly spaced apart.

The invention extends to a non-transitory computer-readable medium having stored thereon a computer program which, when executed by a computer, causes the computer to perform the method as defined above.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
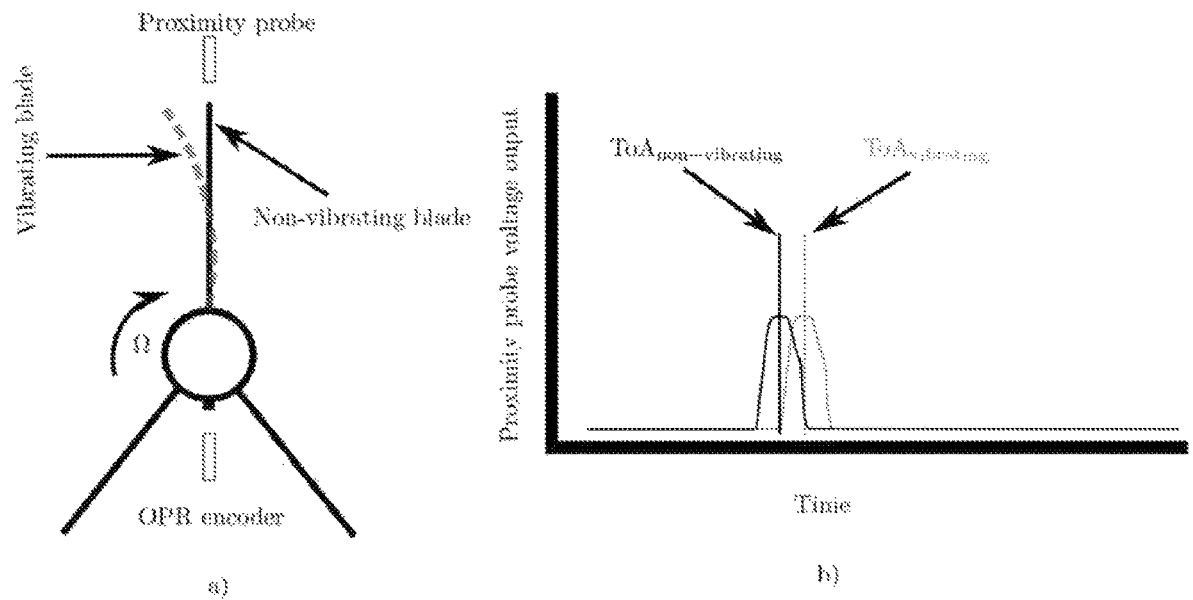
FIG. 1 shows a PRIOR ART schematic representation of the basic principle behind BTT.
Figure 2:
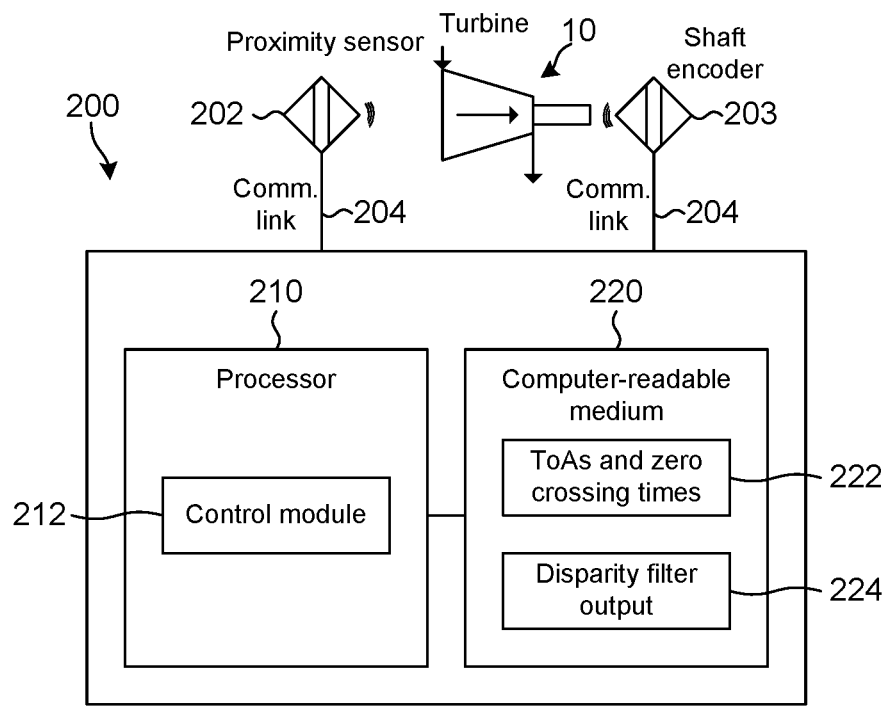
FIG. 2 shows a schematic view of a system configured to determine or estimate blade tip deflection characteristics of moving rotor blades in a turbomachine, in accordance with the invention.

FIG. 2 illustrates a system 200 configured to determine or estimate blade tip deflection characteristics of moving rotor blades in a turbomachine. In this example, the turbomachine is a turbine 10. The turbine 10 may be a conventional turbine and its operation need not necessarily be modified to be compatible with the system 200 (other than incorporation of sensors 202). The turbine 10 comprises a housing and rotor including a shaft with the rotor blades attached thereto (see FIG. 3 for more detail).

The system 200 includes a plurality of sensors 202 mounted to a housing of the turbine 10. In another embodiment, the system 200 may include only a single sensor 202. The system 200 includes a shaft encoder 203 to measure information used to determine the shaft IAP. The system 200 includes a processor 210 connected to the sensors 202 by means of a communication link 204 (which may be wired or wireless). The processor 210 is coupled to a computer-readable medium 220. On the computer-readable medium 220 (which serves as a memory module) is stored proximity probe signals and shaft zero crossing times 222 and the disparity filter outputs 224 these are further described below.

The control module 212 is a conceptual module corresponding to a functional task performed by the processor 210. It is to be understood that the processor 212 may be one or more microprocessors, controllers, Digital Signal Processors (DSPs), or any other suitable computing device, resource, hardware, software, or embedded logic.

Figure 3:
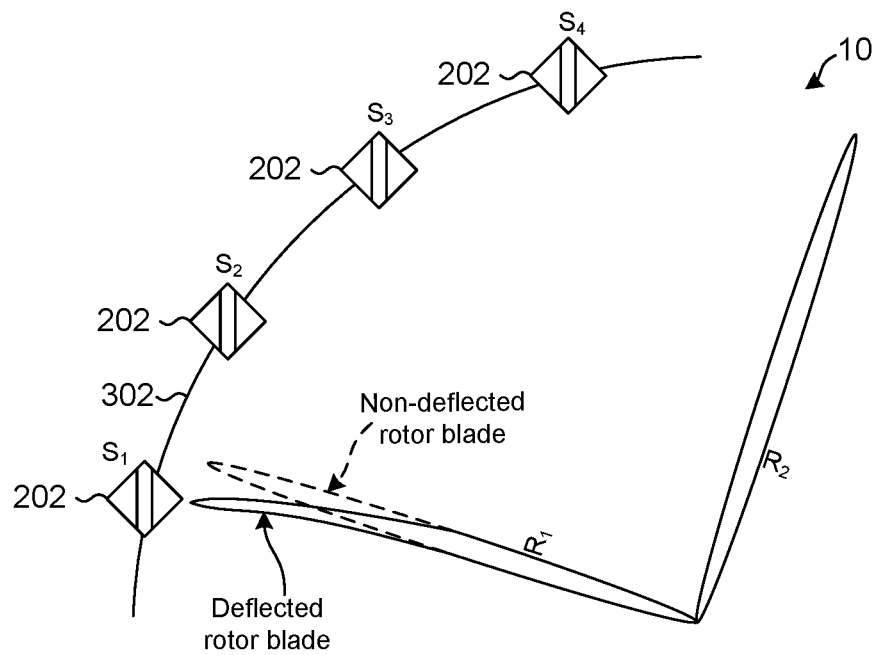
FIG. 3 shows a schematic view of an enlarged portion of a turbine of FIG. 2.

The system 200 has a plurality of proximity sensors 212 (only one of which is illustrated in FIG. 2). FIG. 3 illustrates this in more detail, with the plural sensors 202 being designated S1-S4 and arranged circumferentially on the housing 302. Each proximity sensor 202 is configured to generate a proximity signal due to a proximate tip of a moving rotor blade ($R_1, R_2, \ldots$). These generated proximity signals are stored on the memory module 220 for processing. The system 200 also has a shaft encoder 203 that measures raw signals of the rotor motion, converted to a series of shaft encoder zero crossing times, after which the data is stored on the memory module 220.

Figure 4:
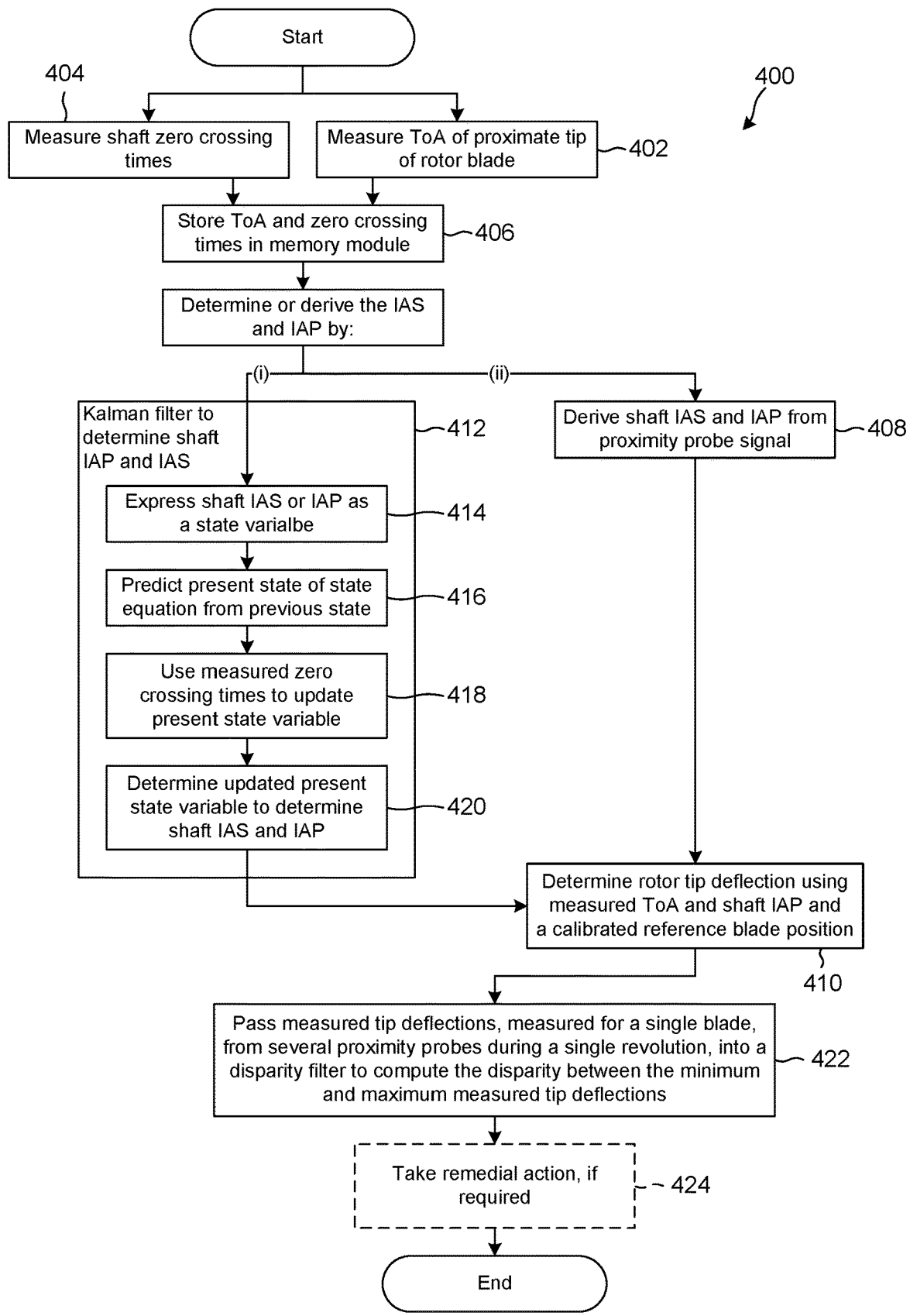
FIG. 4 shows a flow diagram of a method of determining or estimating blade tip deflection characteristics and then determining the disparity between the largest and the smallest deflection of moving rotor blades in a turbomachine, in accordance with the invention.

FIG. 4 illustrates a method 400 of determining or estimating blade tip deflection characteristics of moving rotor blades in a turbomachine, in accordance with the invention. Like many PRIOR ART BTT-related techniques, the method 400 comprises measuring (at step 402) a ToA of a proximate rotor blade tip. The shaft encoder zero crossing times is measured (at step 404) and the control module 212 stores (at step 406) the ToA measurements and the shaft encoder zero crossing times in a memory module provided by the computer-readable medium 220 for processing. Also, the stored measurements may be reviewed later for auditing or record keeping purposes.

The IAS and IAP is derived (at step 412) from the shaft encoder zero crossing times as follows. The shaft IAS is assumed to be linearly varying in time. The IAS during period m is given by Eq. 3. Note that period m can refer to a complete revolution in the case of an OPR shaft encoder or only a section of a revolution in the case of a MPR shaft encoder:

$$\dot{\theta}_m(\tau_m) = a_m \tau_m + \Omega_m \qquad (3)$$

where $$\tau_m = t - t_{start,m} \text{ and } t_{start,m} \leq t \leq t_{start,m+1} \qquad (4)$$

As can be observed from Eq. 3, the IAS is a linear combination of a velocity offset, $\Omega_m$ and a constant acceleration, $a_m$. The time variable, $\tau_m$, denotes the time that has elapsed since the start of the zero crossing time, as shown in Eq. (4). The expression can therefore be used to determine the rotor IAS at any time. The zero-crossing times at the starts of periods m and m+1 are denoted by $t_{start,m}$ and $t_{start,m+1}$.

To solve for the IAS, Eq. 3 is first integrated, giving the rotor Instantaneous Angular Position (IAP), as in Eq. (5):

$$\int_0^{\tau_m} \dot{\theta}_m(\tau_m) = \theta_m(\tau_m) = \tfrac{1}{2} a_m \sigma_m^2 + \Omega_m \tau_m \qquad (5)$$

Two types of boundary conditions are enforced. The first boundary condition dictates the distance traveled by the shaft during the measured period. In the case of an OPR shaft encoder, this is $2\pi$. In the case of a MPR encoder, the distance of that section needs to be known beforehand. For a method to calculate the calibration distances during steady or transient shaft speeds, see [23]. Whatever the distance traveled, it is denoted by $\Delta\theta_m$. This boundary condition is expressed in Eq. 6:

$$\theta_m(T_m) = \tfrac{1}{2} a_m T_m^2 + \Omega_m T_m = \Delta\theta_m \qquad (6)$$

In Eq. (6), $T_m$ denotes period m (or the time between zero crossing times m and m+1). The second boundary condition is that of continuity. The IAS is required to be constant at the start of every new period, expressed in Eq. 7:

$$\dot{\theta}_m(T_m) = \dot{\theta}_{m+1}(0)$$

$$a_m T_m + \Omega_m = \Omega_{m+1} \qquad (7)$$

Eq. (6) and Eq. (7) are two equations that dictate the rotor movement. The acceleration, $a_m$, can be cancelled out, leaving Eq. 8:

$$\tfrac{1}{2} T_m \Omega_m + \tfrac{1}{2} T_m \Omega_{m+1} = \Delta\theta_m \qquad (8)$$

The acceleration can then be calculated with Eq. 9:

$$a_m = \frac{1}{T_m}\Omega_{m+1} - \frac{1}{T_m}\Omega_m \qquad (9)$$

Eq. 8 represents a state equation for the rotor velocity offsets over two periods. This state equation can be solved (at block 412) efficiently in real time by using a Kalman filter by the control module 212 [24, Ch. 13]. A Kalman filter can be used to sequentially estimate the values of a state equation given a measured observation of each state. The method 400 expresses the state variables as random variables, allowing one to calculate the uncertainties inherent in each state. The Kalman filter implementation as used here is described in four steps 412-420.

Step 414 (previous state and state variable): The state variable for each state, n, consists of a column vector containing the velocity offsets from Eq. (8):

$$z_n = \begin{pmatrix} \Omega_n \\ \Omega_{n+1} \end{pmatrix} \qquad (10)$$

For the derivation and solution of the Kalman filter, the index variable n is used instead of the period variable m. This is to avoid confusion, as two consecutive velocity offsets appear within a single state variable as seen in Eq. (10). It is noted that the state variable is a random variable, i.e., a stochastic quantity and not a deterministic value. The state variable is distributed according to Eq. (11):

$$p(z_n) = \mathcal{N}(z_n | \mu_{z_n}, V_n) \qquad (11)$$

In Eq. (11), $\mathcal{N}$ is the shorthand notation for a Gaussian distribution. The mean and covariance of the state variable is given by $\mu_{z_n}$ and $V_n$ respectively. The purpose of the Kalman filter is to determine the mean and covariance of each state variable. This is done through subsequent updating and prediction steps 416-420. A predecessor to the first state needs to be assumed, seeing as it does not exist. The predecessor to the first state (or previous state), given the index n=0, is defined as in Eq. (12):

$$p(z_0) = \mathcal{N}(z_0 | \mu_{z_0}, V_0) \qquad (12)$$

where $$\mu_{z_n} = \begin{pmatrix} \dfrac{\Delta\theta_1}{T_1} \\ \dfrac{\Delta\theta_2}{T_2} \end{pmatrix} \qquad (13)$$

and $$V_0 = \begin{pmatrix} \left[\dfrac{\Delta\theta_1}{10T_1}\right]^2 & 0 \\ 0 & \left[\dfrac{\Delta\theta_2}{10T_2}\right]^2 \end{pmatrix} \qquad (14)$$

In Eq. (12)-(14), the rotor is assumed to have a constant shaft speed during the first two periods. It is therefore the traditional assumption of a constant IAS as discussed above. The standard deviations are taken to be 10% of the mean value. This is considered a wide standard deviation, expressing high uncertainty pertaining to state n=0.

Step 416 (current state): A prediction is now made for the current state. To do this, a transition equation is used. The transition is performed according to Eq. (15):

$$z_{n0} = A_n z_{n-1} \qquad (15)$$

In Eq. (15), the transition matrix, A performs a linear transformation of the previous state variable to get a prediction of the current state variable. To aid in the discussion, two consecutive state variables are presented in Eq. (16):

$$z_{n-1} = \begin{pmatrix} \Omega_{n-1} \\ \Omega_n \end{pmatrix}, z_n = \begin{pmatrix} \Omega_n \\ \Omega_{n+1} \end{pmatrix} \qquad (16)$$

In Eq. (16), it is observed that the constant speed offset $\Omega n$, is shared between the two states. The transition matrix should therefore simply transfer this quantity without alteration. In order to calculate a prediction for $\Omega_{n+1}$, it is assumed that the rotor acceleration remains constant from state n−1 to state n. Equations (17)-(19) derive this transition.

$$a_n = a_{n-1} \tag{17}$$

$$\frac{1}{T_n}\Omega_{n+1} - \frac{1}{T_n}\Omega_n = \frac{1}{T_{n-1}}\Omega_n - \frac{1}{T_{n-1}}\Omega_{n-1} \tag{18}$$

$$\Omega_{n+1} = \left(1 + \frac{T_n}{T_{n-1}}\right)\Omega_n - \frac{T_n}{T_{n-1}}\Omega_{n-1} \tag{19}$$

The transition matrix is therefore given by Eq. (20):

$$A_n = \begin{pmatrix} 0 & 1 \\ -\frac{T_n}{T_{n-1}} & 1 + \frac{T_n}{T_{n-1}} \end{pmatrix} \tag{20}$$

The transition matrix performs the task of predicting the state variable n based on state variable n−1. It is only when inferring state 1, that another transition matrix is used, expressed in Eq. (21). This is necessary as state 0 in Eq. (13) is essentially a constant-speed assumption of state 1 and should not be projected forward.

$$A_1 = \begin{pmatrix} 1 & 0 \\ 0 & 1 \end{pmatrix} \tag{21}$$

It follows that the current prediction for the state variable is distributed according to Eq. (22):

$$p(z_n|z_{n-1}) = \mathcal{N}(z_n|A_n z_{n-1}, \Gamma_n) \tag{22}$$

In Eq. (22), $\Gamma_n$ accounts for additional uncertainty in projecting forward the previous state. A linear model is used to describe the IAS. The more non-linear the true IAS within a revolution, the more uncertainty should be ascribed to the current prediction. The value of this uncertainty is dependent on the dynamics of the specific turbomachine in question and the manner in which it is operated. As in many application of Bayesian statistics, if the prior uncertainties are within realistic ranges, the answers are not sensitive to small differences of prior uncertainties. Sensitivity analyses will be conducted later in the article to demonstrate this point. Here, it is assumed that a 1% deviation from the predicted value is within the 95% confidence band of the current state. In mathematical terms, the 95% confidence band corresponds to two standard deviations, the covariance is therefore given by Eq. 23:

$$\Gamma_n = \begin{pmatrix} \left[\frac{0.01}{2}\mu_{z_{n-1,1}}\right]^2 & 0 \\ 0 & \left[\frac{0.01}{2}\right]^2\left[-\mu_{z_{n-1,0}}\frac{T_n}{T_{n-1}} + \mu_{z_{n-1,1}}\left(1 + \frac{T_n}{T_{n-1}}\right)\right]^2 \end{pmatrix} \tag{23}$$

In Eq. (23), $\mu_{z_{n-1,0}}$ and $\mu_{z_{n-1,1}}$ indicate the first and second elements of the vector $\mu z n-1$ respectively. Another approach to estimating $\Gamma$ is to use Expectation Maximization (EM). Using this approach, the estimated state variables in the past are treated as fixed quantities and the value of $\Gamma$ is found through optimization. The use of EM is non-trivial by nature, and it is not supposed that optimizing the value of $\Gamma$ would increase the effectiveness of the Kalman filter for this particular problem. It is therefore relegated to further study. The interested reader can obtain more information about the process in [24, Ch. 13].

Step 418 (measurement estimation): The measurement process is completely determined by Eq. 8. The left hand side of Eq. 8 constitutes the predicted measured rotational distance of the rotor, whilst the right hand side shows the correct measurement, $\Delta\theta$ radians. The measurement probability density is distributed according to Eq. (24):

$$p(\Delta\theta_n|z_n) = \mathcal{N}(\Delta\theta_n|C_n z_n, \sigma_{\Delta\theta_n}^2) \tag{24}$$

In Eq. (24), the matrix $C_n$ is called the emission matrix and converts the current state estimate into a measurement value. From Eq. (8), the emission matrix can be expressed as in Eq. (25):

$$C_{n=(\frac{1}{2}T_n, \frac{1}{2}T_n)} \tag{25}$$

The variance of Eq. (24) indicates the confidence in the fact that the shaft has revolved $\Delta\theta_n$ radians during period $T_n$. If a MPR shaft encoder is used, this quantity needs to be known beforehand. The uncertainty estimates of MPR shaft encoder section distances can be obtained as described in [23]. If, however, an OPR shaft encoder is used, it is almost 100% certain that the rotor has traveled $2\pi$ radians. The only possible uncertainty in the measurements is due to the sampling rate of the data acquisition system. The acquisition system cannot resolve the time of the pulse to an accuracy smaller than the sampling rate. This is called the quantization or quantification error. If the interval between consecutive samples is denoted as $\Delta t$, the sensitivity of the observed parameter to the sampling rate is estimated in Equations (26)-(30):

Begin with Eq. (8): (26)

$$\Delta\theta_n = \frac{1}{2}T_n\Omega_n + \frac{1}{2}T_n\Omega_{n+1}\Delta_m$$

Derive with respect to $T_n$: (27)

$$\frac{\partial \Delta\theta_n}{\partial T_n} = \frac{1}{2}(\Omega_n + \Omega_{n+1})$$

Multiply with double the sampling rate: (28)

$$\frac{\partial \Delta\theta_n}{\partial T_n}2\Delta t = \Delta t(\Omega_n + \Omega_{n+1})$$

Apply 95% confidence interval: (29)

$$\sigma_{\Delta\theta_n} = \Delta t \frac{1}{2}(\Omega_n + \Omega_{n+1})$$

Substitute in predicted mean values: (30)

$$\sigma_{\Delta\theta_n} = \Delta t \frac{1}{2}\left(\mu_{z_{n-1,1}} + \left[-\mu_{z_{n-1,0}}\frac{T_n}{T_{n-1}} + \mu_{z_{n-1,1}}\left(1 + \frac{T_n}{T_{n-1}}\right)\right]\right)$$

Eq. (28) is multiplied with double the sampling rate because the measurement $T_m$ is dependent on two OPR pulses, therefore double the uncertainty. In Eq. 29, it is assumed that the true distance traveled by the rotor does not deviate by more than $\Delta t \frac{1}{2}(\Omega_n \Omega_{n+1})$ from $2\pi$ with 95% confidence. This is an extremely small quantity. If the rotor speed is 314.16 rad/s (3000 rpm) and a sampling rate of 1 MHz is being used by the data acquisition system, the standard deviation is a mere $1.00 \times 10^{-4}\pi$ radians.

Step 418 (measurement estimation): Now all the relevant quantities have been defined in order to obtain the distribution specified in Eq. (11). The updated state variable parameters are given in Eq. (31) and (32):

$$\mu_{z_n} = A_n\mu_{z_{n-1}} + K_n(\Delta\theta_n - C_n A_n \mu_{z_{n-1}}) \tag{31}$$

$$V_n = (I - K_n C_n) P_{n-1} \tag{32}$$

where $$P_{n-1} = A_n V_{n-1} A_n^T + \Gamma_n \tag{33}$$

$$K_n = P_{n-1} C_n^T (C_n P_{n-1} C_n^T + \sigma_{\Delta\theta_n}^2)^{-1} \tag{34}$$

The matrices shown in Equations (33) and (34) are the Kalman gain and transition covariance of state n respectively. Once the updated current state variable has been determined, the IAP in period m can be expressed as a function of state variable m. Note that here a return in made to the original indexing variable m. With some manipulation, the IAP can be expressed as a function of the state variable as shown in Eq. (37).

Start with Eq. (5): \hfill (35)

$$\theta_m(\tau_m) = \frac{1}{2} a_m \tau_m^2 + \Omega_m \tau_m$$

Substitute in Eq. (9): \hfill (36)

$$\theta_m(\tau_m) = \frac{1}{2} \left( \frac{1}{T_m} \Omega_{m+1} - \frac{1}{T_m} \Omega_m \right) \tau_m^2 + \Omega_m \tau_m$$

Simplify \hfill (37)

$$\theta_m(\tau_m) = \left( \tau_m - \frac{\tau_m^2}{2T_m} \right) \Omega_m + \left( \frac{\tau_m^2}{2T_m} \right) \Omega_{m+1}$$

From Eq. (37), it can be seen that the IAP is a linear combination of two normally distributed random variables. It then follows that the IAP is itself normally distributed [25]. The distribution of the IAP is given in Eq. (38):

$$p(\theta_m(\tau_m)) = \mathcal{N}(\theta_m \mid \mu_{\theta_m}(\tau_m), \sigma_{\theta_m}^2(\tau_m)) \tag{38}$$

where $$\mu_{\theta_m}(\tau_m) = \left( \tau_m - \frac{\tau_m^2}{2T_m} \right) \mu_{z_m,0} + \left( \frac{\tau_m^2}{2T_m} \right) \mu_{z_m,1} \tag{39}$$

$$\sigma_{\theta_m}^2(\tau_m) = \left( \tau_m - \frac{\tau_m^2}{2T_m} \right)^2 V_{m,00} + \left( \frac{\tau_m^2}{2T_m} \right)^2 V_{m,00} + 2\left( \tau_m - \frac{\tau_m^2}{2T_m} \right) \left( \frac{\tau_m^2}{2T_m} \right) V_{m,01} \tag{39}$$

Eq. 38 can be used to determine the probability density of the rotor IAP at any time.

To the end of calculating blade tip deflections, the expected distance between the blades and the sensors must be calculated. As stated earlier, it is often assumed that the blade static positions are fixed to equal increments around the rotor. In reality, small manufacturing tolerances cause slight variability in rotor blade spacing. In addition to this, each blade tip might respond differently to each unique sensor. This could be because of slight variations in blade length, blade stagger angle or the blade tip's surface responsiveness to the proximity probes. It is therefore a requirement that each sensor's position should be uniquely determined for each blade. This results in a set of calibrated radial distances, $\theta_{b_i,s_j,C}$, determining the distance between the $j^{th}$ sensor and the $i^{th}$ blade. Here, the subscript C indicates a calibrated variable.

The blade ToA is determined from a pulse generated when a blade passes underneath a probe. There are different types of triggering criteria that can be used. One of the most common triggering criteria is to apply a threshold value. If the signal voltage crosses this value, the ToA is recorded. Other examples of triggering criteria can be seen in the work of Zimmer [26]. Also, the order in which blades arrive at different sensors can be determined from approximate knowledge of the sensor positions, knowledge of the number of rotor blades and the shaft speed. The present work assumes that ToA determination as well as the order of blade arrival at the sensors are determined adequately.

The calibration is performed over a predetermined number of revolutions, denoted by $M_C$ here. The elapsed time from the start of period m until Blade i reaches Sensor j is denoted by $\tau_{m,b_i,s_j}$. Note that each blade arrives at each probe in a specific period once every revolution, as such the subscript m is used here to denote either revolution m in the case of an OPR encoder, or the relevant period in revolution m in the case of a MPR shaft encoder. This results in a set of measurements for the distance, calculated by Eq. (41):

$$\theta_{m,b_i,s_j} = \mathcal{N}(\theta_m \mid \mu_{\theta_m}(\tau_{m,b_i,s_j}), \sigma_{\theta_m}^2(\tau_{m,b_i,s_j})) \tag{41}$$

In Eq. (41), $\theta_{m,b_i,s_j}$ is the angular distance traveled by the blade in revolution m. A single, calibrated distance between Blade i and Sensor j is obtained by assuming that all distances over the calibration periods are independent random variables. One can then simply multiply all $\theta_{m,b_i,s_j}$ values together over all $M_C$ revolutions as shown in Eq. (42):

$$p(\theta_{b_i,s_j,C}) = \prod_{m=1}^{M_C} \mathcal{N}(\theta_{m,b_i,s_j} \mid \mu_{\theta_m}(\tau_{m,b_i,s_j}), \sigma_{\theta_m}^2(\tau_{m,b_i,s_j})) \tag{42}$$

$$p(\theta_{b_i,s_j,C}) = \prod_{m=1}^{M_C} \left[ \frac{1}{2\pi\sigma_{\theta_m}^2(\tau_{m,b_i,s_j})^{\frac{1}{2}}} \right] \tag{43}$$

$$\exp\left( \sum_{m=1}^{M_C} -\frac{1}{\sigma_{\theta_m}^2(\tau_{m,b_i,s_j})} \right) (\theta_{b_i,s_j,C} - \mu_{\theta_m}(\tau_{m,b_i,s_j}))^2$$

If it is assumed that $\theta_{b_i,s_j,C}$ is equally likely to take on any value, a simple matter of expanding the exponential term in Eq. (43), completing the square and normalising over the resulting distribution yields the solution, given in Eq. (44).

$$p(\theta_{b_i,s_j,C}) = \mathcal{N}(\theta_{b_i,s_j,C} \mid \mu_{\theta_{b_i,s_j,C}}, \sigma_{\theta_{b_i,s_j,C}}^2) \tag{44}$$

where $$\mu_{\theta_{b_i,s_j,C}} = \frac{\sum_{m=1}^{M\_cal} \frac{\mu_{\theta_m}(\tau_{m,b_i,s_j})}{\sigma_{\theta_m}^2(\tau_{m,b_i,s_j})}}{\sum_{m=1}^{M\_cal} \frac{1}{\sigma_{\theta_m}^2(\tau_{m,b_i,s_j})}} \tag{45}$$

$$\sigma_{b_i,s_j,C}^2 = \frac{1}{\sum_{m=1}^{M\_cal} \frac{1}{\sigma_{\theta_m}^2(\tau_{m,b_i,s_j})}} \tag{46}$$

Eq. 44 therefore provides a calibrated distance between Blade i and Sensor j that can be used to calculate the tip deflection of the blade arriving at the sensor. Note that the distance is not an absolute distance from a specific reference point on the rotor. It is rather a measure of the distance the blade travels from the start of the measured period, whether it is the start of the new revolution or the start of a new MPR section. Transforming these values into an absolute position would simply amount to adding a deterministic quantity to these values. The methods used in this article does not require knowledge of absolute distances to calculate the tip displacement. The tip displacement of the blade at the sensor in any period m is denoted by $x_{b_i,s_j,m}$ and its probability density distribution is given by Eq. (47):

$$p(x_{b_i,s_j,m}) = \mathcal{N}(x_{b_i,s_j,m} \mid \mu_{x_{b_i,s_j,m}}, \sigma^2_{x_{b_i,s_j,m}}) \quad (47)$$

where $$\mu_{x_{b_i,s_j,m}} = R(\mu_{\theta_m}(\tau_{m,b_i,s_j}) - \mu_{\theta_{b_i,s_j,C}}) \quad (48)$$

$$\sigma^2_{x_{b_i,s_j,m}} = R(\sigma^2_{\theta_m}(\tau_{m,b_i,s_j}) + \sigma^2_{\theta_{b_i,s_j,C}}) \quad (49)$$

where R is the radial distance from the centre of the rotor to the blade tip. For the purposes of this specification, R is expressed in units of μm. Note that the calibration can be repeated at any stage by simply selecting a new set of revolutions to calibrate over. The determination of the tip deflections are indicated by step 410 in Method 400.

Figure 5:
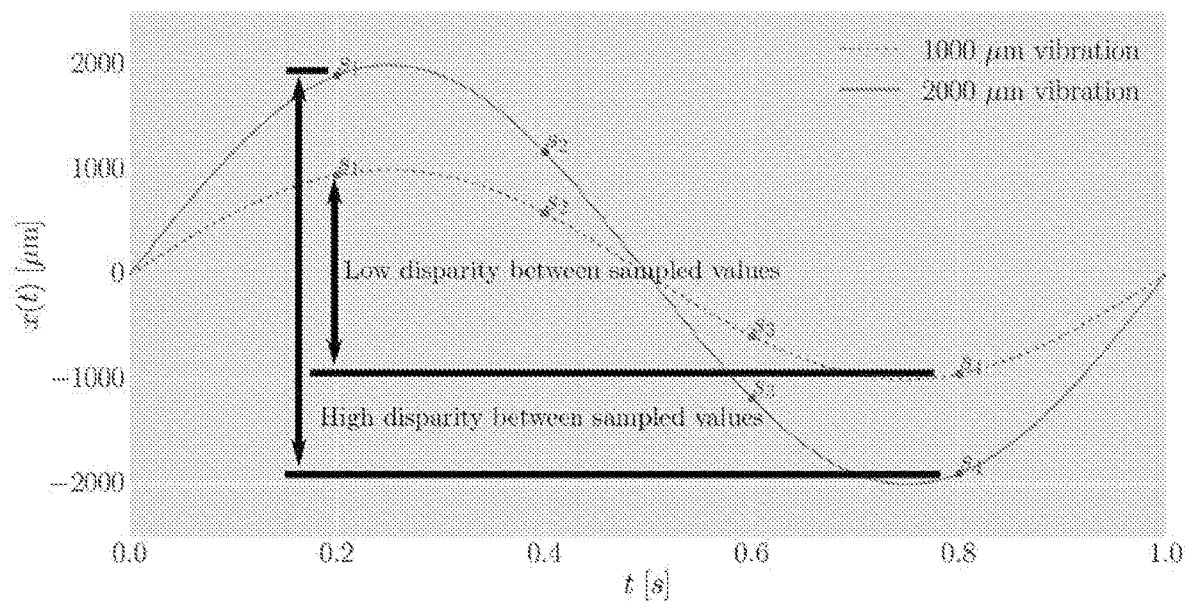
FIG. 5 shows a graphical illustration of blade tip deflections captured by four different probes; the sampled values for two different vibration amplitudes are shown (derived from the method of FIG. 4). This figure illustrates that the disparity filter will have a higher output for a higher vibration amplitude.

Regarding resonance detection (step 422), the tip displacements can be calculated efficiently using the shaft IAP and a calibrated distance between each blade and each sensor. That information is now used to identify resonance events. To aid in this, consider a blade tip vibrating at a frequency of 1 Hz. The BTT system is of such a nature that four proximity probes are used to sample the signal. Consider two different vibration amplitudes, 1000 μm and 2000 μm. The sampled tip displacements for a single revolution of the shaft are shown in FIG. 5. The samples from the four different proximity probes are indicated by $s_1$, $s_2$, $s_3$ and $s_4$ respectively.

In FIG. 5, it is observed that as the vibration amplitude increases, the difference between the maximum and the minimum of the sampled values increase considerably. This can be ascribed to the fact that different sensors around the turbine casing will be sampling the vibration signal at different stages of the blade's vibration cycle. This increase in difference will be referred to as an increase in the signal disparity. The sampled tip displacements can therefore be used to obtain the signal disparity within a single revolution. The signal disparity can then be used as a valuable indicator of a resonance event. Let $x_{b_i,m}$ denote the tip deflections measured by all the sensors for blade i during revolution m. A disparity indicator can then be calculated as in Eq. (50):

$$\mathcal{D}(x_{b_i,m}) = \max(x_{b_i,m}) - \min(x_{b_i,m}) \quad (50)$$

In Eq. (50), the function $\mathcal{D}$ is called a disparity filter as its response is large where the disparity among tip deflections is also large. At this stage of the analysis, the tip deflections are treated as deterministic quantities and not as random variables as in Eq. (47). A disparity filter operating on stochastic quantities is completely conceivable but adds little to the indicative power of the filter. The tip deflections used in the filter is therefore simply the mean values of the tip deflections as expressed by Eq. (48).

Another useful attribute of the signal disparity when resonance is present, is that the disparity gradually changes as the blade enters and exits a resonance event. To illustrate this, a simulation of a resonance event is performed. A rotor with five proximity sensors is simulated. The proximity sensors are located at 21.69°, 34.66°, 50.08°, 60.32° and 69.93° from the first blade. The locations of the sensors bear no specific significance except that it coincides with the laboratory experimental setup that is to follow later on in the description. A shaft run-up is performed from a speed of 556 RPM to 710 RPM in 15 seconds. The tip displacement signal as shown in Eq. (51) is enforced upon the blades.

$$x_{tip\ displacement}(t) = 1000\ \sin(125 \times 2\pi t)\left(0.2 + 0.8\ \exp\left(\frac{(t-6)^2}{0.25}\right)\right) \quad (51)$$

Figure 6:
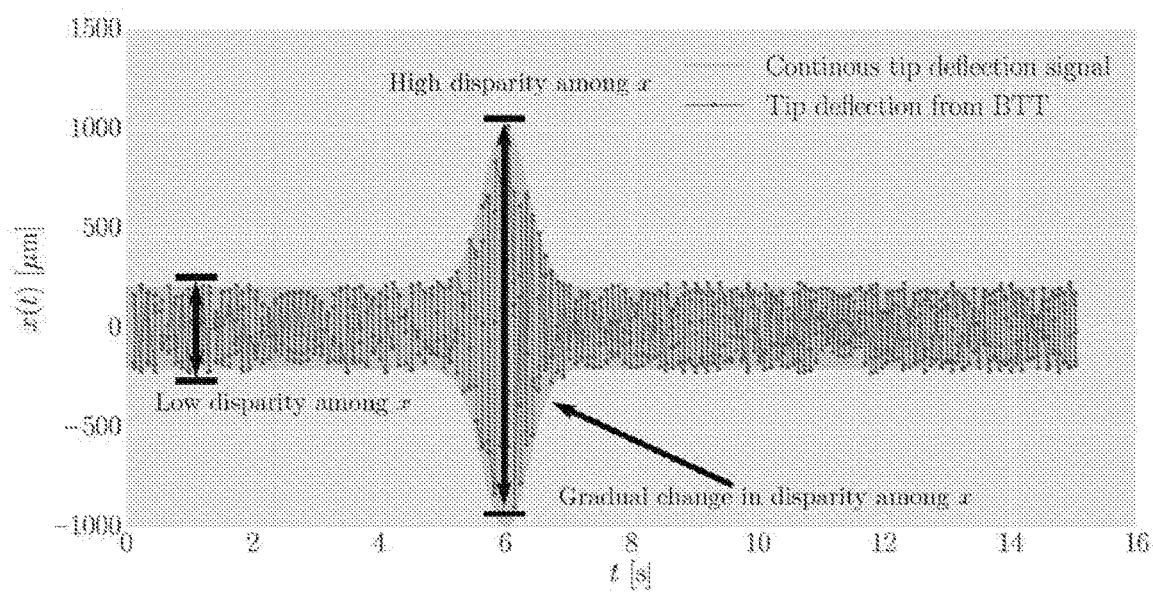
FIG. 6 shows a graphical view of simulated resonance event is shown for which the tip deflections are indicated. It can be observed that the disparity between the measured tip deflections increase as the vibration amplitude increase.

Once again, the choice of 125 Hz as a resonant frequency coincides with the experimental setup that is to follow later on in the article. The tip displacement simulated in Eq. (51) exhibits low vibration levels until the sixth second is approached. The blade then enters and exits a resonance event peaking at t=6 seconds. A graphical representation of the tip displacements as sampled by the BTT system is shown in FIG. 6. The tip displacements as a continuous signal are also included in the background of the figure.

The depicted resonance event in FIG. 6 is however an idealised representation of a true resonance event. In general, real rotor conditions will result in more noise and lower vibration amplitudes. Under such circumstances it can be difficult to identify resonance events. The next section will show that even in the presence of large amounts of noise, the disparity filter is an excellent indicator of resonance events.

Experiments and Results

Experiments are conducted in order to demonstrate two things:
1. That using a Kalman filter to determine the IAS results in more accurate blade tip displacement calculations than with a constant shaft speed assumption.
2. That the disparity filter can be used to identify resonance events.

The first experiment is simulated. This allows for complete control over the physical phenomena at play and allows for an exact comparison between the two methods. The second experiment is a laboratory-conducted experiment. The applicability of the disparity filter in noisy real-world conditions is therefore demonstrated. All tests are conducted using an OPR shaft encoder. This is done because most BTT systems use OPR shaft encoders. Also, all findings are equally applicable to MPR encoders, making it redundant to repeat them.

IAS vs. PRIOR ART constant speed assumption: A run-up of a five blade rotor is simulated. The initial speed of the rotor is 45.0 radians/second (429.7 RPM) with a constant acceleration of 4.0 radians/seconds$^2$ (38.2 RPM/second). The simulation is performed for 15 seconds. The sampling rate of the simulated shaft encoder and proximity probes is 1 MHz. This sampling rate coincides with the sampling rate from the laboratory experimental setup. Five proximity sensors, located at radial distances of 21.69°, 34.66°, 50.08°, 60.32° and 69.93° from the first blade is simulated. The rotor blades are spaced equally around the circumference of the rotor. The rotor blade tips are vibrating according to Eq. (51). Although the shaft speed is perfectly linear, measurement errors will be present due to the finite sampling rate of the system.

Having completed the simulation, the OPR pulses are available to determine the shaft speed. This is done using both the Kalman filter approach as well as the constant speed assumption usually taken in literature. With the constant speed assumption, the IAS is calculated as done in Eq. (52):

$$IAS_{constant,m} = \frac{2\pi}{T_m} \quad (52)$$

Figure 7:
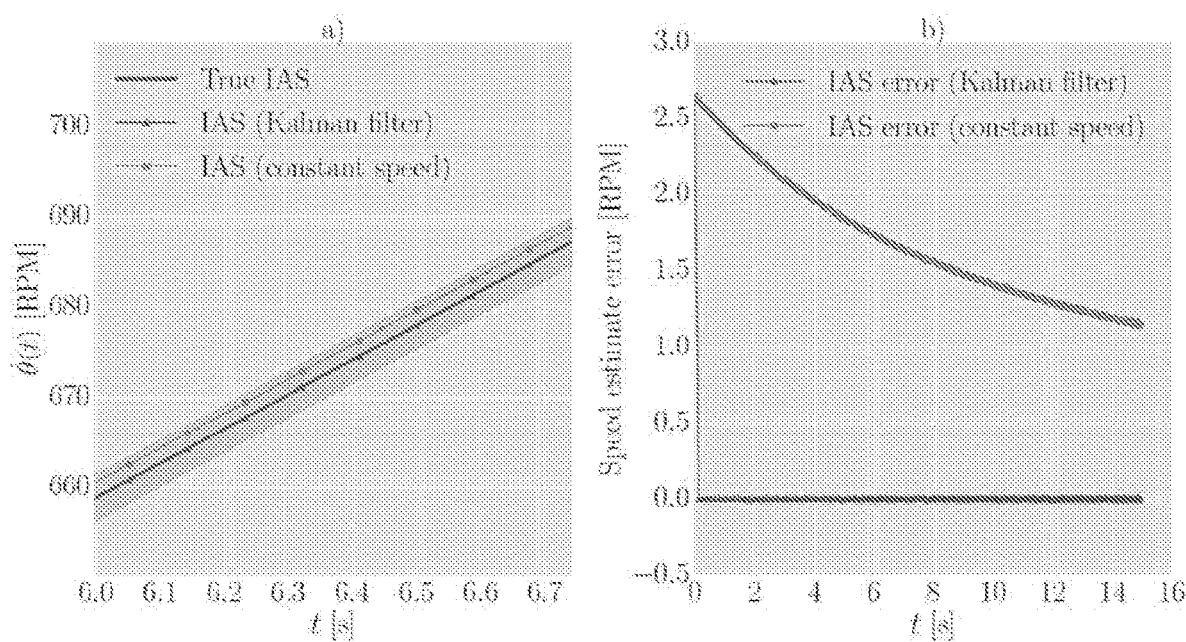
FIG. 7 shows a graphical view of a comparison between the shaft speeds obtained by using the Kalman filter vs. using a constant shaft speed assumption which is commonly considered a PRIOR ART method. a) A small part of the simulation is indicated. The IAS as determined by both methods is indicated along with the true IAS. b) The differences between the true IAS and both tested methods are indicated (derived from the method of FIG. 4)

The results, along with the true IAS, are shown in FIG. 7.

Figure 8:
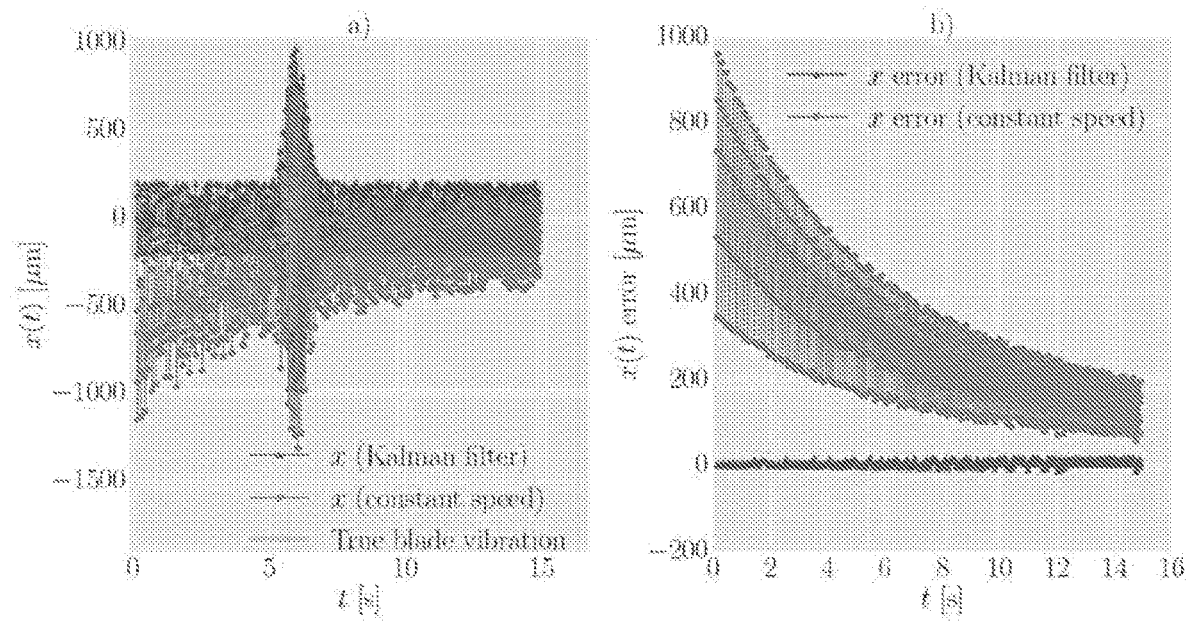
FIG. 8 shows a graphical view of a comparison of tip displacement calculations using a Kalman filter approach (from the method of FIG. 4) and a constant shaft speed assumption commonly used in PRIOR ART approaches. a) A time history of the calculated tip displacements along with the true vibration signal is indicated in the background. b) A figure indicating the errors in the tip deflection calculation.

The results are presented in units of RPM, i.e. through using Eq. (47) and Eq. (2) respectively, are shown in FIG. 8. From FIG. 8a), a few observations can be made. Firstly, it is observed that the tip displacements as calculated using the constant speed assumption is much less accurate than the tip displacements as calculated with the Kalman filter approach. It is also observed that this effect is more pronounced at low shaft speeds than at high shaft speeds. From FIG. 8b) it is observed that errors as high as approximately 1000 µm occur for the constant speed assumption tip deflections. This is observed during the initial stages of the run-up. Given that the vibration signal has a range of only 400 µm initially, the noise is roughly 2.5 times larger than the signal. As the shaft speed increases, the errors from the constant speed assumption decrease but remains relatively high throughout. The tip displacements as calculated through the Kalman filter, however, are very accurate throughout the whole simulation.

The experiment conducted here conclusively shows that a constant shaft speed assumption should not be used in any BTT application. Using a Kalman filter to determine the IAS yields more accurate tip displacements that can be used in further analyses. It is stressed at this point that no additional hardware requirements are imposed by using a Kalman filter. It is a different processing technique that can be used with any existing BTT system.

Figure 9:
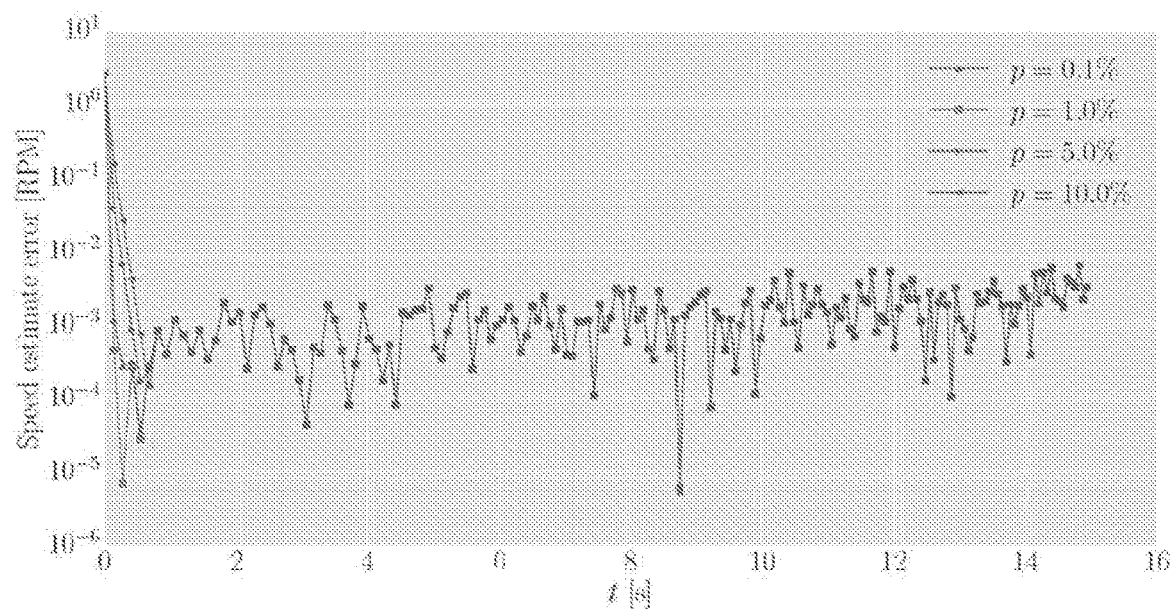
FIG. 9 shows a graphical view of Kalman filter sensitivity to the additional uncertainty percentage in projecting forward the previous state (from the method of FIG. 4)

Sensitivity analysis: In the derivation of the Kalman filter, the additional uncertainty in projecting forward the previous state was selected as 1% with a 95% confidence. Let this uncertainty percentage be denoted by $\rho$. It was also mentioned that the algorithm is not particularly sensitive to this quantity. Here, a simple sensitivity analysis is performed to demonstrate this point. The simulated experiment is repeated four times where 300 the uncertainty percentage is taken to be p=0.1%, p=1%, p=5% and p=10% respectively. The errors between the estimated IAS and the true IAS are indicated in FIG. 9. Note that the differences between the test results are very small, such that it warrants the use of a log scale representation.

Figure 10:
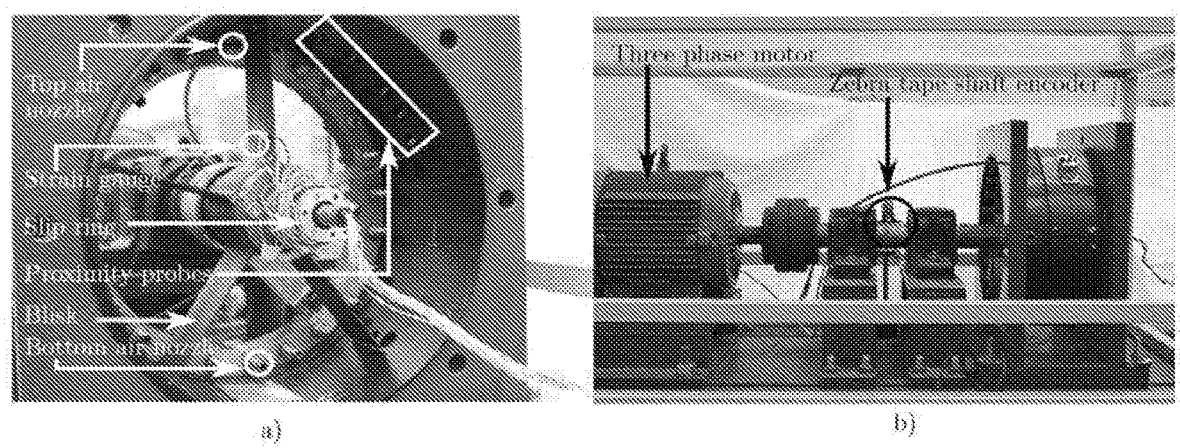
FIG. 10 shows an annotated photograph of an experimental setup to implement the method 400 of FIG. 4. a) The front-end of the setup indicating the blisk, strain gauge, slip ring, proximity probes and air nozzles. b) The back-end of the setup indicating the zebra tape shaft encoder and the three phase motor.

Disparity filter validation: a five blade rotor blisk with an outer diameter of 324 mm is used to validate the use of a disparity filter to identify vibration events. In the experimental setup, the blades of the blisk are rectangular blades. The first four natural frequencies of the blades are 125.1, 315, 504.5 and 749.3 Hz respectively. The blisk is attached to a rotor driven by a three phase motor. The blades are excited by two continuous streams of pressurized air, the nozzles of which are located on the top and bottom of the setup. The vibration response of the first blade is measured by a strain gauge. The strain gauge signal is communicated to the data acquisition system via an end-mounted slip ring. A zebra tape is utilized as a shaft encoder. A zebra tape encoder is a MPR shaft encoder. For the purposes of this experiment, only the pulse caused by the rotation of the butt joint is used in the analysis, effectively providing an OPR shaft encoder. Five eddy current probes were used as proximity probes and are located in such a manner that the middle of the blade chord passes underneath the probes. The eddy current probes are high sensitivity probes with a sensitivity of 8 mV/µm. A photograph of the front and back of the experimental setup is shown in FIG. 10.

A NI-USB6366 data acquisition card was used to sample the signals. The strain gauge signal was sampled at a rate of 4 KHz, far above the Nyquist limit for properly sampling up to the third natural frequency. The digital sampling functionality was utilized for the proximity probe signals and the shaft encoder. The triggering criteria for the blade pulses were therefore a threshold criteria with a TTL transition level of 0.8 V. The sampling rate for the digital signals is 1 MHz. Higher sampling rates are possible but not used due to memory restrictions of the acquisition computer and software. The Nation Instruments software SignalExpress was used to acquire the signals on the laptop. The eddy current probes have a default signal output of between −20 V and 0 V. The digital input of the data acquisition card, however, operates on a voltage of 0-5 V and as such a signal converter box was constructed to convert the signal.

To demonstrate the use of a disparity filter to identify vibration events, four different tests were conducted. For all the tests, the goal was to excite the blades' first natural frequency. In order to excite a specific natural frequency, Eq. (53) can be used to determine the shaft speed at which resonance takes place.

$$\Omega = 2\pi \frac{125.1}{EO} \quad (53)$$

In Eq. (53), EO is the Engine Order (EO) of excitation. The EO should be an integer value. Because of the fact that the experimental setup uses two pressurized air jets, the EO should be a multiple of two. It was observed that an EO of 8 corresponded to proper excitation of the blades. The shaft speed for an EO=8 excitation is 938.25 RPM. Resonance at EO=10 was found to be much subtler than for EO=8. The four different tests correspond to different possible situations one might encounter in turbomachine operation.

Test 1: A test is conducted where a typical rotor run-up is simulated. The rotor blades enter into an EO=8 resonance event for a brief period after which the blade tip responses gradually decreases after the resonance zone has been transcended.

Test 2: A test is conducted at a constant shaft speed where the air excitation is first absent, and then suddenly switched on. The excitation frequency during this "on" state coincides with the blades' first natural frequency and as such the vibration response of the blades increase rapidly. This is also an EO=8 excitation. This test simulates an event where the flow pattern inside a turbomachine changes suddenly, like with the opening of a blow-off valve to prevent compressor stall.

Test 3: This test is intended to mimic the blade vibration levels when a turbine is settling onto a steady operating condition near a resonance. This can typically occur where a steam turbine is settling onto its operating speed after a run-up. The shaft speed is increases until it is just below than the resonance speed caused by an EO=8 excitation. This was done to test the disparity filter's sensitivity to small vibration amplitudes.

Test 4: This test is similar to Test 1 in the sense that a run-up is simulated, but rather at an EO excitation of 10. It was found that this excitation condition resulted in a much subtler vibration response than at EO=8. This test is conducted to demonstrate the disparity filter's robustness to noise and small vibration amplitudes.

For Test 2, the shaft was manually adjusted to approximately 938 RPM. For the other three tests, where the shaft speeds were transient, the shaft speeds were manually increased through a motor speed control knob. The purpose of changing the shaft speed manually, as opposed to a computer controlled output, was to demonstrate the method's robustness to irregularities in the shaft speed.

Figure 11:
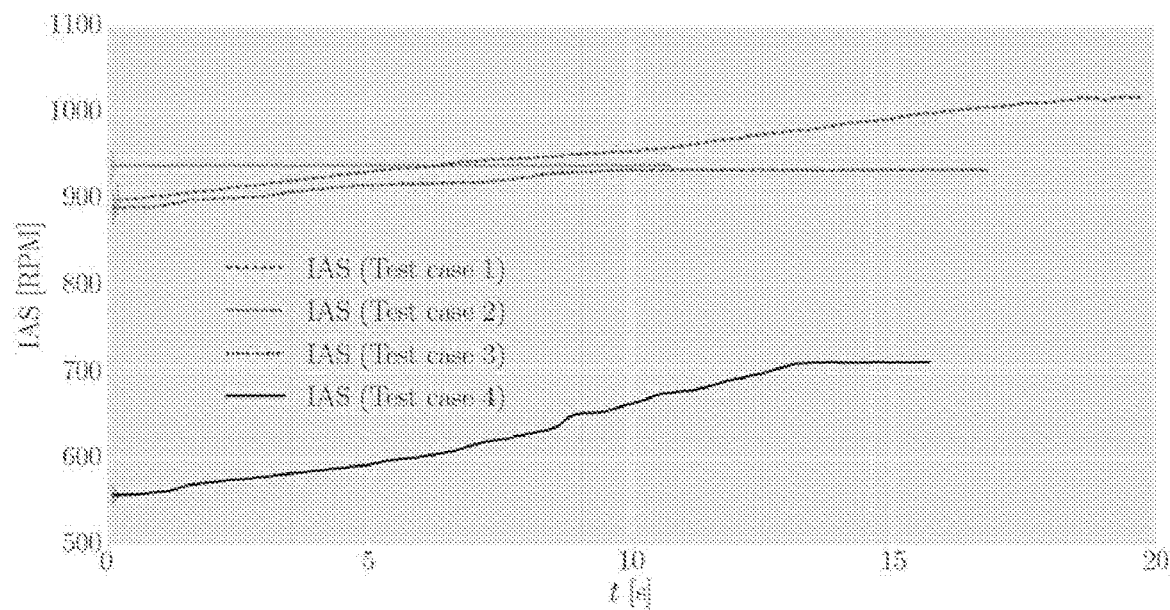
FIG. 11 shows a graphical view of shaft speeds of four different tests (from the method of FIG. 4). In Tests 1-3, the speed at which maximum resonance occurs is at 938.25 RPM. For Test case 4, the resonance speed is at 750.6 RPM.

Regarding the IAS results, the shaft speeds for all four tests, along with the standard deviation bands from the Kalman filter, are shown in FIG. 11. In FIG. 11, it can be observed that the shaft speeds of Tests 1 and 2 equals 938.25 RPM at some point in time. It is therefore expected that these two test cases will result in a large vibration response. Test 3, however, stops just short of the optimum shaft speed for resonance. It is therefore expected that this test case will yield a lower resonance amplitude than the other methods. Test case 4 transcends the optimum resonance speed of 750.6 RPM for EO=10, but the resonance amplitude is not nearly as high as for the EO=8 tests.

Figure 12:
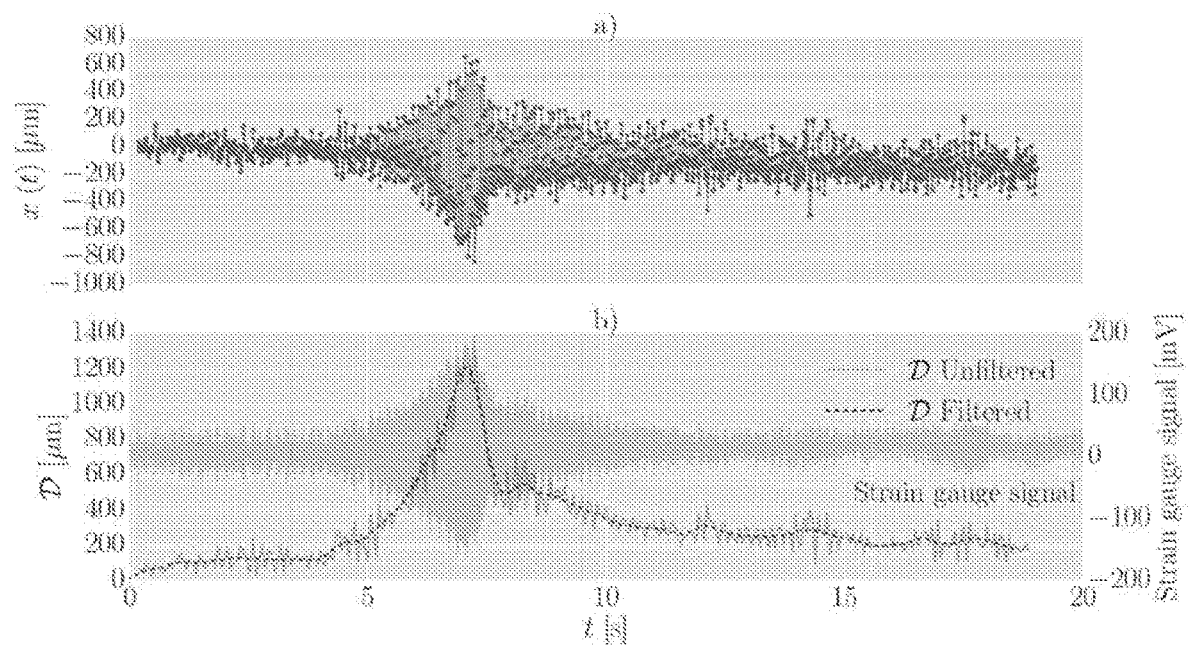
FIG. 12 shows a graphical view of results for Test case 1 (from the method of FIG. 4). a) The tip displacements are sampled by the BTT system for the first blade of the rotor. b) The strain gauge signal for the first blade as well as the output of the disparity filter, both filtered and unfiltered.

The results for the first test case, simulating a typical run-up event, are presented in FIG. 12. It can be seen from FIG. 12 that the maximum response due to resonance occurs at approximately 7 seconds. The vibration amplitude increases by roughly a factor of four when resonance occurs. It can be seen from FIG. 12a) that the BTT measurements respond well to the resonance event. By looking at FIG. 12b) it is observed that the disparity filter has a high response where resonance is seen to occur. The disparity filter output can also be filtered to get rid of high frequency noise not caused by the resonance event. A second order Butterworth filter with a cut-off frequency of 10% the Nyquist limit was implemented digitally.

The disparity filter provides a valuable visual aid to determine the vibration event. It is also completely conceivable to automate the detection process by setting a threshold value to the disparity filter output. Another interesting observation can be made from FIG. 12b). It does not seem that the disparity filter values after the resonance event are decreasing to the same levels as before the event. This is a prime example of where the blade steady positions change during rotor operation. The change here is attributed simply to the fact that subtle vibration is present in the blades even if resonance is not. Calibrating the blade static positions before and after a resonance event will yield different calibration values because the sensors are sampling different parts of the vibration cycle. It would be wise to recalibrate the steady state position after the resonance event. Another option is to use data from both before and after the resonance event to recalibrate the static position.

Figure 13:
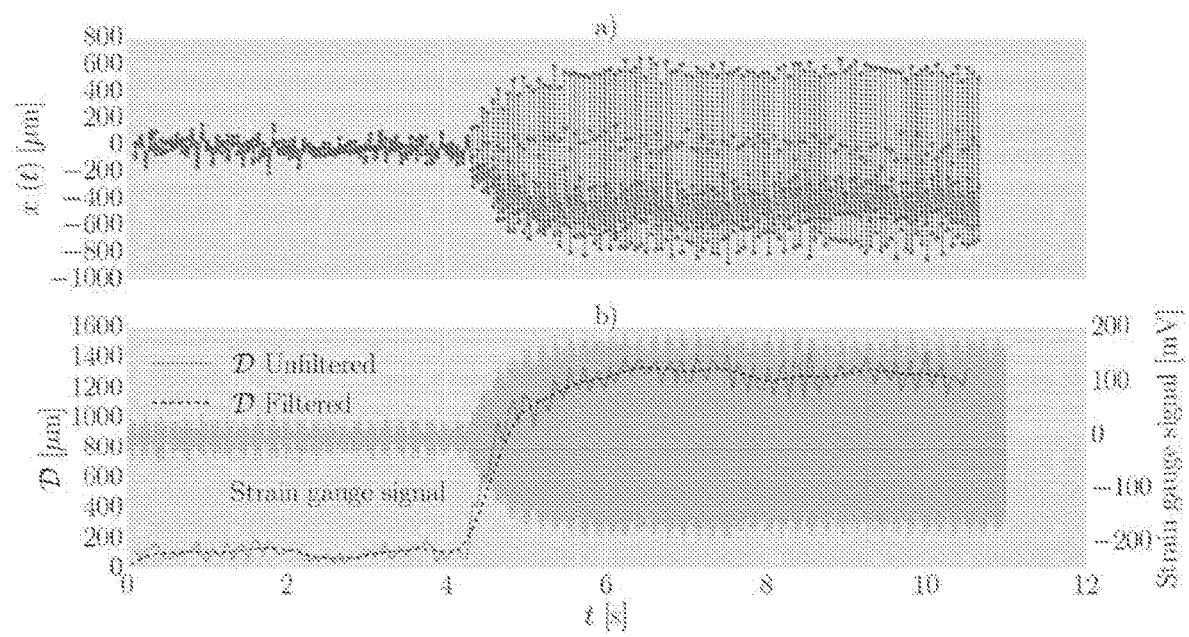
FIG. 13 shows a graphical view of results for Test case 2 (from the method of FIG. 4). a) The tip displacements are sampled by the BTT system for the first blade of the rotor. b) The strain gauge signal for the first blade as well as the output of the disparity filter, both filtered and unfiltered.

The results for the second test case, simulating a sudden change in working fluid characteristics during steady state operation, are presented in FIG. 13. It can be seen from FIG. 13 that resonance starts to occur at roughly 4.2 seconds. The vibration amplitude increases more than for the previous test case, by a factor of roughly five. It can be seen from FIG. 13a) that the BTT measurements respond well to the resonance event. From investigating FIG. 13b), it is seen that the disparity filter's response suddenly increases as soon as the resonance event commences. The disparity filter output then settles around a steady value. The disparity filter successfully aids in the detection of a sudden change in blade vibration amplitude. It can again be seen that setting a threshold value for the disparity filter output could automate the resonance detection process.

Figure 14:
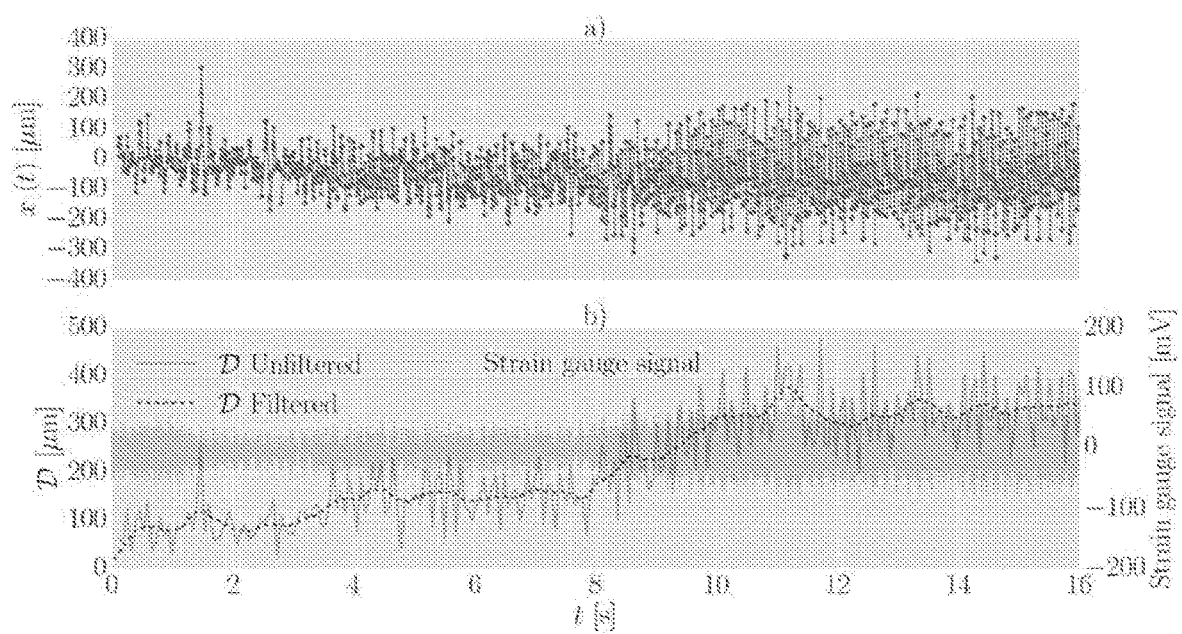
FIG. 14 shows a graphical view of results for Test case 3 (from the method of FIG. 4). a) The tip displacements as sampled by the BTT system for the first blade of the rotor. b) The strain gauge signal for the first blade as well as the output of the disparity filter, both filtered and unfiltered.

The results for the third test case, simulating a subtle increase in vibration amplitude as the turbine settles near a resonance zone, are presented in FIG. 14. From FIG. 14, it is clear that the resonance is much subtler than for the previous two cases. Indeed, the vibration amplitude increases by only a factor of 1.6 from the start to the end of the recorded section. It can be seen from FIG. 14a) that the BTT measurements gradually increase with time. With the levels of noise present in the raw BTT measurements, however, it is not completely apparent that resonance is taking place. A person skilled in interpreting BTT data might spot the resonance, but an unskilled user might miss the event. From FIG. 13b), the disparity filter's response increases gradually. It can be observed unmistakably that the vibration amplitude is increasing, especially from the period t=8 seconds to t=11 seconds.

Setting a threshold of 200 μm on the low-pass filtered disparity filter values would have been adequate to successfully identify a resonance event.

Figure 15:
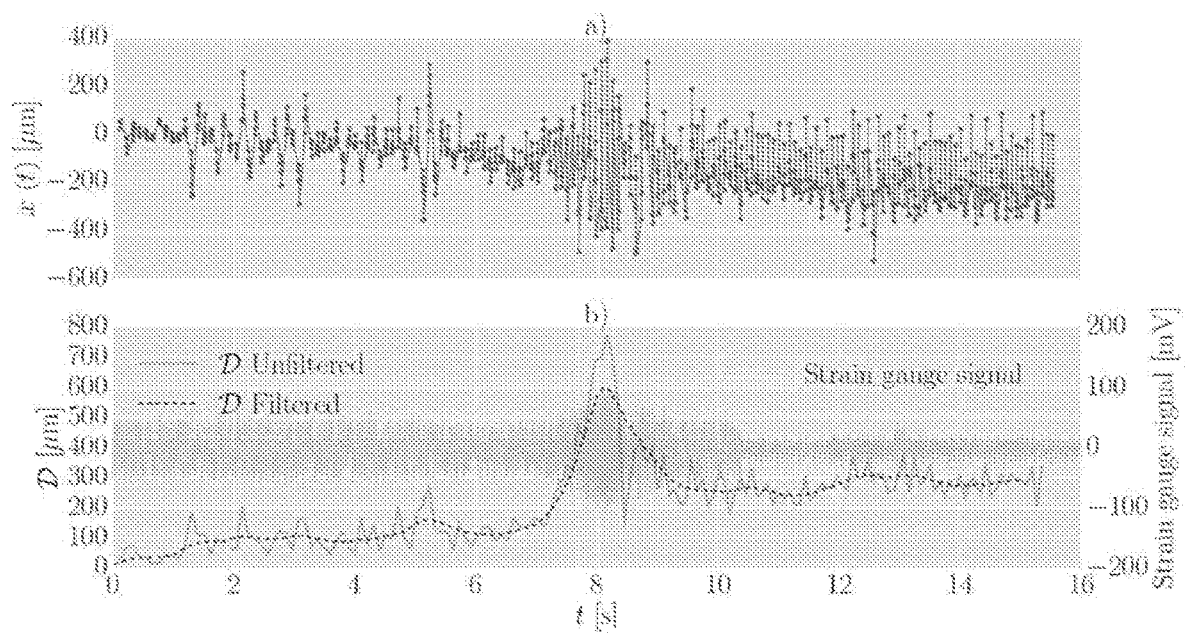
FIG. 15 shows a graphical view of results for Test case 4 (from the method of FIG. 4). a) The tip displacements as sampled by the BTT system for the second blade of the rotor. b) The strain gauge signal for the first blade as well as the output of the disparity filter, both filtered and unfiltered.

The results for the fourth test case, showing a resonance event over a run-up with EO=10 excitation, are presented in FIG. 15. In FIG. 15, the BTT results were analysed for the second blade, whilst the strain gauge signal for the first blade is shown. This was done to demonstrate the robustness of the method, as the BTT data for the second blade appeared particularly noisy. Since the blades are near identical and vibrate independently, it is quite certain that the strain gauge response is representative of all the other blades as well. It can be seen from the strain gauge signal that the short-lived vibration event occurs at approximately t=8 seconds. It can be seen from FIG. 12a) that the BTT measurements are very noisy. It is by no means clear that a vibration event has occurred, especially due to the apparent high levels of vibration after the resonance event. Simple amplitude thresholding would not be an acceptable means of triggering a resonance event.

From FIG. 12b), the disparity filter's response reveals the resonance event at t=8 seconds. An untrained operator would easily be able to identify this vibration event from the disparity filter values. Setting a threshold value of 200 μm on the low-pass filtered disparity filter values would once again serve as an adequate technique to automatically detect a resonance event. The same shift in blade static values from before and after the resonance event as in FIG. 14b) is observed here.

Figure 16:
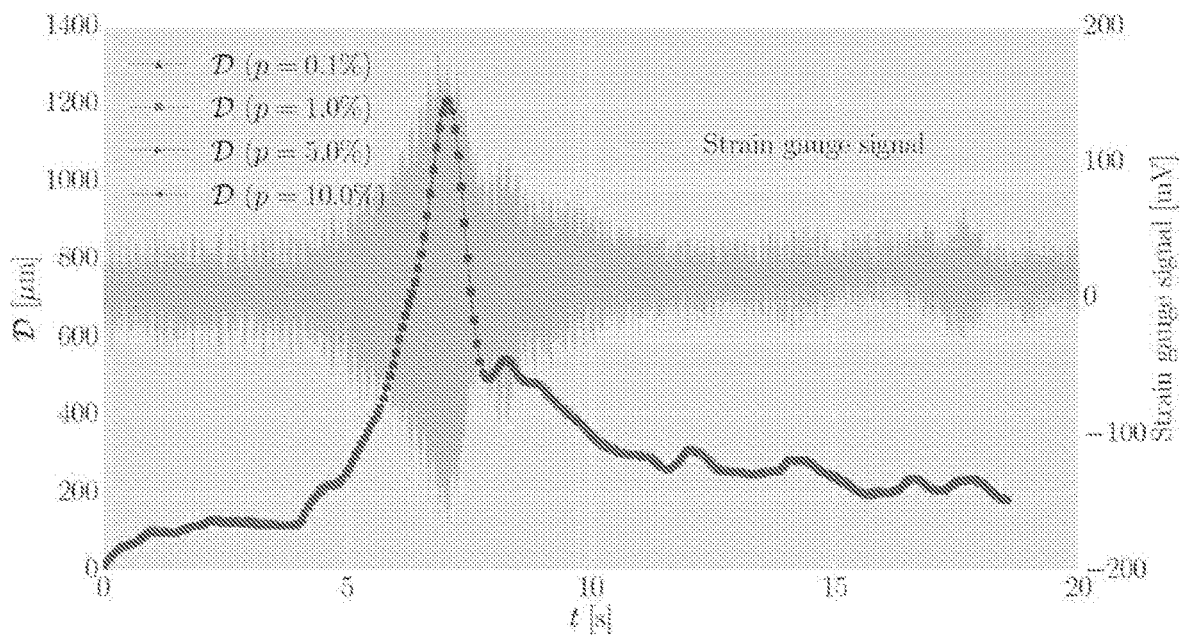
FIG. 16 shows a graphical view of sensitivity analysis (in the experimental method 400) in which the disparity filter output values are for Test case 1 and p=0.1%, 1%, 5% and 10%.

The disparity filter's sensitivity to the parameter p is tested for a sensitivity analysis. Test case 1 is analysed four times with the same four p values as in the previous sensitivity analysis. The results are indicated in FIG. 16. From FIG. 16, it can be seen that there is no discernible difference between the results from the four different values for p. This is not surprising as the previous sensitivity analysis indicates that the results from all the p values converge after seven revolutions, and even before complete convergence they to very close to one another.

This description set out to develop signal processing techniques that can perform two of the most fundamental functions of a BTT system, namely to determine rotor blade tip deflections from a shaft encoder and ToA data, and secondly to identify resonance events. A Kalman filter implementation was described to determine the shaft IAS from an OPR shaft encoder. The Kalman filter output is stochastic quantities, so that uncertainties are preserved. A method was then indicated whereby the blade static positions could be determined via calibration. The static positions could be recalibrated at any time if deemed necessary. From the calibrated blade static positions, the blade tip deflections are calculated. It has been demonstrated through a simulated experiment that these tip deflections are more accurate than tip deflections obtained through the traditional assumption in BTT literature of a constant shaft speed between revolutions. Four laboratory experiments have been conducted where resonance events of different types are identified through the use of a disparity filter. The disparity filter output has been shown to be a simple to implement yet powerful method to aid in the determination of rotor blade resonance events.

REFERENCES

[1] S. Madhavan, R. Jain, C. Sujatha, A. S. Sekhar, Condition monitoring of turbine rotor blade on a gas turbine engine, International Congress on Sound & Vibration 20 (2013) 7-11.
[2] K. Grant, Experimental Testing of Tip-Timing Methods used for Blade Vibration Measurement in the Aero-Engine, Phd, Cranfield University, 2004.
[3] D. Sabbatini, B. 460 Peeters, T. Martens, K. Janssens, Data acquisition and processing for tip timing and operational modal analysis of turbomachinery blades, in: 10th International Conference on Vibration Measurements by Laser and Noncontact Techniques, volume 60, 2012, pp. 52-60. URL: http://link.aip.org/link/APCPCS/v1457/i1/p52/s1&Agg=doi.doi:10.1063/1.4730542.
[4] M. Zielinski, G. Ziller, Noncontact vibration measurements on compressor rotor blades, Measurement Science and 465 Technology 11 (2000) 847-856.
[5] B. O. Al-Bedoor, Blade vibration measurement in turbomachinery: Current status, Shock and Vibration Digest 34 (2002) 455-461.
[6] H. Guo, F. Duan, J. Zhang, Blade resonance parameter identification based on tip-timing method without the once-per revolution sensor, Mechanical Systems and Signal Processing 66 (2016) 625-639.
[7] P. Proch´azka, F. Vanˇek, Non-contact systems for monitoring blade vibrations of steam turbines, in: Proceedings of ISMA, 2012, pp. 3359-3372. URL: http://www.isma-isaac.be/past/conf/isma2012/proceedings/papers/isma2012_0058.pdf.
[8] P. Prochazka, F. Vanek, New Methods of Noncontact Sensing of Blade Vibrations and Deflections in Turbomachinery, Instrumentation and Measurement, IEEE Transactions on 63 (2014) 1583-1592.
[9] Agilis, Non-Intrusive Stress Measurement Systems, 2014.
[10] Z. Chen, Y. Yang, Y. Xie, B. Guo, Z. Hu, Non-contact crack detection of high-speed blades based on principal component analysis and Euclidian angles using optical-fiber sensors, Sensors and Actuators A: Physical 201 (2013) 66-72.
[11] S. Heath, M. Imregun, An improved single-parameter tip-timing method for turbomachinery blade vibration measurements using optical laser probes, International Journal of Mechanical Science 38 (1996) 1047-1058.
[12] P. Beauseroy, R. Lengell´e, Nonintrusive turbomachine blade vibration measurement system, Mechanical Systems and Signal Processing 21 (2007) 1717-1738.
[13] A. Von Flotow, P. Tappard, Overview of Blade Vibration Monitoring Capabilities, 2011.
[14] H. Andr´e, F. Girardin, a. Bourdon, J. Antoni, D. R´emond, Precision of the IAS monitoring system based on the elapsed time method in the spectral domain, Mechanical Systems and Signal Processing 44 (2014) 14-30.
[15] P. Ivey, K. Grant, C. Lawson, Tip timing techniques for turbomachinery HCF condition monitoring, in: the $16^{th}$ Symposium on Measuring Techniques 485 in Transonic and Supersonic Flow in Cascades and Turbomachines, September, 2002, pp. 1-7. URL: http://www-g.eng.cam.ac.uk/whittle/rigs/symposium/papers/3-4.pdf.
[16] M. R. Mansisidor, Resonant blade response in turbine rotor spin tests using a laser-light probe non-intrusive measurement system, Msc (aeronautical), Naval Postgraduate School, Monterey, Calif., 2002.
[17] P. Proch´azka, F. Vanˇek, Contactless Diagnostics of Turbine Blade Vibration and Damage, Journal of Physics: Conference 490 Series 305 (2011) 1-11.
[18] P. Russhard, J. D. Back, Blade tip timing, 2014.
[19] I. B. Carrington, J. R. Wright, J. E. Cooper, G. Dimitriadis, A comparison of blade tip timing data analysis methods, Proceedings of the Institution of Mechanical Engineers, Part G: Journal of Aerospace Engineering 215 (2001) 301-312.
[20] Z. Hu, J. Lin, Z.-S. Chen, Y.-M. Yang, X.-J. Li, A non-uniformly under-sampled blade tip-timing signal reconstruction method for blade vibration monitoring, Sensors 15 (2015) 2419-37.
[21] K. Joung, S. Kang, K. Paeng, N. Park, H. Choi, Y. You, A. von Flotow, ANALYSIS OF VIBRATION OF THE TURBINE BLADES USING NON-INTRUSIVE STRESS MEASUREMENT SYSTEM, in: Proceedings of the ASME Power Conference, ASME, Georgia, 2006, pp. 391-397.
[22] P. Russhard, TIMING ANALYSIS, 2013.
[23] D. H. Diamond, P. S. Heyns, A. J. Oberholster, Online shaft encoder geometry compensation for arbitrary shaft speed profiles using Bayesian regression, Mechanical Systems and Signal Processing Under review (2015).
[24] C. Bishop, Pattern recognition and machine learning, 3rd ed., Springer, Singapore, 2006. URL: http://www.library.wisc.edu/selectedtocs/bg0137.pdf.
[25] I. Guttman, S. Wilks, J. S. Hunter, Introductory Engineering Statistics, 3rd ed., John Wiley & Sons, New York, 1965.
[26] A. K. Zimmer, Investigation of the impact of turbine blade geometry on near-field microwave blade tip time of arrival measurements, Ph.D. thesis, Georgia Institute of Technology, 2008.

The invention claimed is:

1. A method for measuring rotor blade tip deflections of turbomachine rotor blades during operation using Blade Tip Timing (BTT), the turbomachine comprising a housing and rotor including a shaft with the rotor blades attached thereto and at least one proximity probe mounted to the housing, the method comprising:
  measuring, by the proximity sensor, a proximity signal caused by a presence of a proximate tip of a moving rotor blade (the "rotor blade tip");
  determining, by a control module, a Time-of-Arrival (ToA) of the rotor blade tip from the measured signal;
  measuring, by a shaft encoder, a time that the shaft starts to rotate a measurable angular distance and a time the shaft has completed its rotation of the measurable distance (these times are henceforth referred to as zero crossing times);
  storing, in a memory module at least temporarily, timing data indicative of a plurality of ToA measurements of the rotor blade and the zero crossing times;
  determining, by the control module, the shaft Instantaneous Angular Position (IAP) between at least two zero crossing times, which determination comprises:
    expressing, by the control module, the shaft IAP between at least two zero crossing times as a continuous, non-constant IAP mathematical function of time, with unknown function coefficients; and calculating, by the control module, the unknown function coefficients of the IAP mathematical function using at least the following information:
the angular distance travelled by the shaft in between the recorded zero crossing times; and
the values of the recorded zero crossing times applicable to the IAP mathematical function;
determining, by the control module, the shaft IAP at each stored ToA using the IAP mathematical function; and
calculating, by the control module, the rotor blade tip deflection at each ToA using the IAP at each ToA and a stored IAP value representing an expected angular arrival location.

2. The method as claimed in claim 1, comprising raising an alert in response to the rotor blade tip deflection exceeding a first threshold.

3. The method as claimed in claim 2, wherein raising the alert includes sending an alert message to a designated recipient.

4. The method as claimed in claim 1, comprising automatically stopping the turbomachine in response to the rotor blade tip deflection exceeding a second threshold.

5. The method as claimed in claim 4, wherein:
the control module is connected to a control system of the turbomachine; and
the method includes sending, by the control module, an interrupt message to the control system of the turbomachine.

6. The method as claimed in claim 1, comprising measuring a tip deflection every time that the associated rotor blade passes the sensor.

7. The method as claimed in claim 6, wherein:
there are plural sensors arranged circumferentially around the housing; and
the method includes measuring, by the plural circumferentially arranged sensors, the proximity signal caused by the rotor blade tip at various angular orientations.

8. The method as claimed in claim 1, comprising determining, by the control module, the values of the measurable distances the shaft has travelled in between zero crossing times.

9. The method as claimed in claim 1, comprising deriving, by the control module, zero crossing times and the corresponding angular distances travelled by the shaft from the ToA values and using those values in the calculation of the IAP mathematical function.

10. The method as claimed in claim 1, comprising using a Kalman filter to calculate the IAP function coefficients.

11. The method as claimed in claim 10, wherein using the Kalman filter comprises:
expressing, by the control module, the shaft (IAP) as a state-space equation where each state is represented by a different angular distance travelled by the rotor between two zero crossing times;
filtering, by the control module, using a Kalman filter, each state of the state equation which comprises:
predicting a present state of the state equation from the previous state of the state equation;
using the prediction of the present state of the state equation to estimate the rotor IAP; and
using the stored zero crossing times to update the estimated state variable, leading to a final estimation of the present state,
determining, from the present state, the shaft IAP.

12. The method as claimed in claim 1, comprising calculating the stored IAP for each blade and each sensor combination where the stored IAP represents the expected arrival angular position.

13. The method as claimed in claim 1, comprising calculating, by the control module, the difference between largest and smallest tip deflections for a single blade obtained through the blade passing two or more proximity probe sensors during a single revolution (henceforth referred to as the disparity filter output) and determining if the disparity filter output indicates a resonance event.

14. The method as claimed in claim 13, comprising raising an alert in response to the disparity filter output exceeding a first threshold.

15. A non-transitory computer-readable medium having stored thereon a computer program which, when executed by a computer, causes the computer to perform the method as claimed in claim 1.

16. A system configured to measure rotor blade tip deflections of turbomachine rotor blades during operation using Blade Tip Timing (BTT), the turbomachine comprising a housing and rotor including a shaft with the rotor blades attached thereto and at least one proximity probe mounted to the housing, the system comprising:
at least one proximity sensor mounted into the housing and configured to measure a proximity signal from a presence of a proximate tip of a moving rotor blade (the "rotor blade tip");
a shaft encoder operable to measure the time that the shaft starts to rotate a measurable angular distance and the time the shaft has completed its rotation of the measurable distance (these times are henceforth referred to as zero crossing times);
a memory module configured to store, at least temporarily, timing data indicative of a plurality of ToA measurements and the shaft encoder zero crossing times; and
a control module configured to:
calculate the ToA from the ToA signal;
determine the shaft Instantaneous Angular Position (IAP) between at least two zero crossing times, which comprises:
expressing, by the control module, the shaft IAP between at least two zero crossing times as a continuous, non-constant mathematical function of time, with unknown function coefficients;
calculating the unknown function coefficients of the beforementioned mathematical function using at least the following information:
the angular distance travelled by the shall in between the zero crossing times;
the values of the zero crossing times applicable to the mathematical function;
determining the shaft IAP at each stored ToA using the solved IAP mathematical function; and
calculating the rotor blade tip deflection, in either angular or rectilinear units or both, at each ToA using the IAP at each ToA and a stored IAP value representing the expected angular arrival location.

17. The system as claimed in claim 16, comprising a plurality of proximity sensors spaced circumferentially around the housing.

18. The system as claimed in claim 17, wherein the sensors are spaced circumferentially along a 90° arc.

19. The system as claimed in claim 18, wherein the sensors are irregularly spaced apart.

20. The system as claimed in claim 16, wherein the shaft encoder is a Once Per Revolution (OPR) incremental shaft encoder to measure the zero crossing times at each complete revolution of the shaft.

21. The system as claimed in claim 16, wherein the shaft encoder is a Multiple Pulses Per Revolution (MPR) incremental shaft encoder that can be used to measure the zero crossing times at each increment of the encoder.

* * * * *